US012732963B2

(12) United States Patent
Guo et al.

(10) Patent No.: US 12,732,963 B2
(45) Date of Patent: Sep. 8, 2026

(54) METHOD FOR SENDING TWO LEVELS OF CONTROL CHANNELS, TERMINAL DEVICE, AND COMMUNICATIONS APPARATUS

(71) Applicant: Huawei Technologies Co., Ltd., Shenzhen (CN)

(72) Inventors: Wenting Guo, Shanghai (CN); Hongjia Su, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 17/664,092

(22) Filed: May 19, 2022

(65) Prior Publication Data

US 2022/0279486 A1 Sep. 1, 2022

Related U.S. Application Data

(63) Continuation of application No. PCT/CN2019/119796, filed on Nov. 20, 2019.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
CPC ............. H04W 72/02; H04W 72/0446; H04W 72/0453; H04W 72/20
(Continued)

(56) References Cited

U.S. PATENT DOCUMENTS

2013/0311575 A1* 11/2013 Woods ............... H04N 21/8456 709/206
2014/0313919 A1* 10/2014 Berg ......................... H04J 1/16 370/252
(Continued)

FOREIGN PATENT DOCUMENTS

CN 103200687 A 7/2013
CN 107736064 A 2/2018
(Continued)

OTHER PUBLICATIONS

Lenovo et al., "Sidelink Physical layer structures in NR V2X", 3GPP TSG RAN WG1 #98bis, R1-1910144, Oct. 14-20, 2019, 6 Pages, Chongqing, China.
(Continued)

*Primary Examiner* — Thuong Nguyen
(74) *Attorney, Agent, or Firm* — Slater Matsil, LLP

(57) ABSTRACT

A method comprises: selecting, from a first resource set or a second resource set, a resource occupied by second-level control information, wherein the first resource set occupies an nth symbol to an (n+k)th symbol in a time unit, a time domain start symbol of the second resource set is an (n+k+1)th symbol in the time unit, n is 0 or 1, k is a positive integer, the first resource set comprises a resource used to send first-level control information, and the first-level control information occupies all symbols occupied by the first resource set; and sending the first-level control information and the second-level control information.

18 Claims, 14 Drawing Sheets

(51) Int. Cl.
*H04W 72/0453* (2023.01)
*H04W 72/20* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2016/0006601 | A1* | 1/2016 | Suzuki | H04L 41/40 370/228 |
| 2018/0192397 | A1 | 7/2018 | Seo | |
| 2019/0373614 | A1* | 12/2019 | Yum | H04W 72/53 |
| 2020/0022148 | A1* | 1/2020 | Tang | H04W 72/0453 |
| 2020/0100276 | A1* | 3/2020 | Oh | H04W 16/14 |
| 2020/0288482 | A1* | 9/2020 | Yi | H04W 72/23 |
| 2021/0044403 | A1* | 2/2021 | Zhang | H04L 5/0053 |
| 2021/0076409 | A1* | 3/2021 | Goto | H04W 72/1268 |
| 2021/0127413 | A1* | 4/2021 | Lu | H04W 72/40 |
| 2021/0144770 | A1* | 5/2021 | Tang | H04W 74/0833 |
| 2021/0195644 | A1* | 6/2021 | Shi | H04W 72/23 |
| 2021/0227577 | A1* | 7/2021 | Yang | H04L 5/0048 |
| 2021/0385028 | A1* | 12/2021 | Chen | H04W 72/23 |
| 2022/0061073 | A1* | 2/2022 | Yang | H04W 72/1273 |
| 2022/0201711 | A1* | 6/2022 | Lee | H04L 5/0044 |
| 2022/0216967 | A1* | 7/2022 | Gong | H04L 27/26025 |
| 2022/0272765 | A1* | 8/2022 | Xu | H04W 74/006 |
| 2022/0279486 | A1* | 9/2022 | Guo | H04W 72/0453 |

FOREIGN PATENT DOCUMENTS

| | | | |
|---|---|---|---|
| RU | 2659802 | C1 | 7/2018 |
| WO | 2018135905 | A1 | 7/2018 |

OTHER PUBLICATIONS

Nokia et al., "Discussion of physical layer structure for sidelink", 3GPP TSG RAN WG1 #98bis, Oct. 14-20, 2019, 16 Pages, Chongqing, China.
CATT, "Physical layer structure for NR sidelink", 3GPP TSG RAN WG1 Meeting #99, R1-1912153, Nov. 18-22, 2019, 22 Pages, Reno, USA.
Sequans Communications, "On NR sidelink physical layer structure", 3GPP TSG RAN WG1 Meeting #99, R1-1913010, Nov. 18-22, 2019, 8 Pages, Reno, USA.
3GPP TS 36.211 V14.12.0, (Sep. 2019), 3rd Generation Partnership Project; Technical Specification Group Radio Access Network; Evolved Universal Terrestrial Radio Access (E-UTRA); Physical channels and modulation (Release 14), pp. 1-196.
3GPP TS 38.211 V15.7.0 (Sep. 2019), 3rd Generation Partnership Project; Technical Specification Group Radio Access Network; NR; Physical channels and modulation (Release15), 97 pages.
3GPP TS 38.212 V15.7.0. (Sep. 2019), 3rd Generation Partnership Project; Technical Specification Group Radio Access Network; NR; Multiplexing and channel coding (Release 15), 101 pages.
3GPP TS 38.213 V15.7.0 (Sep. 2019), 3rd Generation Partnership Project; Technical Specification Group Radio Access Network; NR; Physical layer procedures for control (Release 15), 108 pages.
3GPP TS 38.214 V15.7.0 (Sep. 2019), 3rd Generation Partnership Project; Technical Specification Group Radio Access Network; NR; Physical layer procedures for data (Release 15), 106 pages.
3GPP TS 38.331 V15.7.0 (2019-19), 3rd Generation Partnership Project; Technical Specification Group Radio Access Network; NR; Radio Resource Control (RRC) protocol specification (Release 15), 527 pages.
Huawei et al., "Sidelink physical layer structure for NR V2X", 3GPP TSG RAN WG1 Meeting #98, R1-1908039, Prague, Czech Republic, Aug. 26-30, 2019, 32 pages.
Nokia et al., "Discussion of physical layer structure for sidelink", 3GPP TSG RAN WG1 #98bis, R1-1910512, Chongqing, China, Oct. 14-20, 2019, 16 pages.
Nokia et al., "Discussion of Physical layer structure for sidelink", 3GPP TSG RAN WG1 #99, R1-1911952, Reno, NV, US, Nov. 18-22, 2019, 13 pages.
Samsung, "On physical layer structures for NR V2X", 3GPP TSG RAN WG1 #99 Meeting, R1-1912458, Reno, NV, US, Nov. 18-22, 2019, 12 pages.
LG Electronics, "Discussion on physical layer structure for NR sidelink", 3GPP TSG RAN WG1 #99, R1-1913235, Reno, NV, US, Nov. 18-22, 2019, 36 pages.
Intel Corporation, "Sidelink physical structure for NR V2X communication", 3GPP TSG RAN WG1 Meeting #99, R1-1913255, Reno, NV, US, Nov. 18-22, 2019, 36 pages.
3GPP TSG RAN WG1 Meeting #98bis, R1-1910054, "Sidelink physical layer structure for NR V2X", Huawei, HiSilicon, Discussion and Decision, Chongqing, China, Oct. 14-20, 2019, total 35 pages.
3GPP TSG RAN WG1 #98bis, R1-1910554, "Design of NR V2X Physical Layer Structures", Fraunhofer HHI, Fraunhofer IIS, Discussion and Decision, Oct. 14-20, 2019, total 11 pages.
3GPP TSG RAN WG1 Meeting #99, R1-1911882, "Sidelink physical layer structure for NR V2X", Huawei, HiSilicon, Discussion and Decision, Reno, USA, Nov. 18-22, 2019, total 35 pages.
3GPP TSG RAN WG1 #99, R1-1912287, "Design of NR V2X Physical Layer Structures", Fraunhofer HHI, Fraunhofer IIS, Discussion and Decision, Reno, USA, Nov. 18-22, 2019, total 11 pages.

* cited by examiner

First terminal device

Second terminal device

FIG. 2

First terminal device

Second terminal device

S301: Determine, in a second resource set, a resource occupied by a second-level control channel and a resource occupied by a data channel S302: Send the second-level control channel and the data channel S303: Receive the second-level control channel and the data channel S304: Determine the resource occupied by the second-level control channel in the second resource set S305: Parse the second-level control channel based on the resource occupied by the second-level control channel, to obtain the resource occupied by the data channel in the second resource set S306: Parse the data channel based on the resource occupied by the data channel, to obtain data carried on the data channel

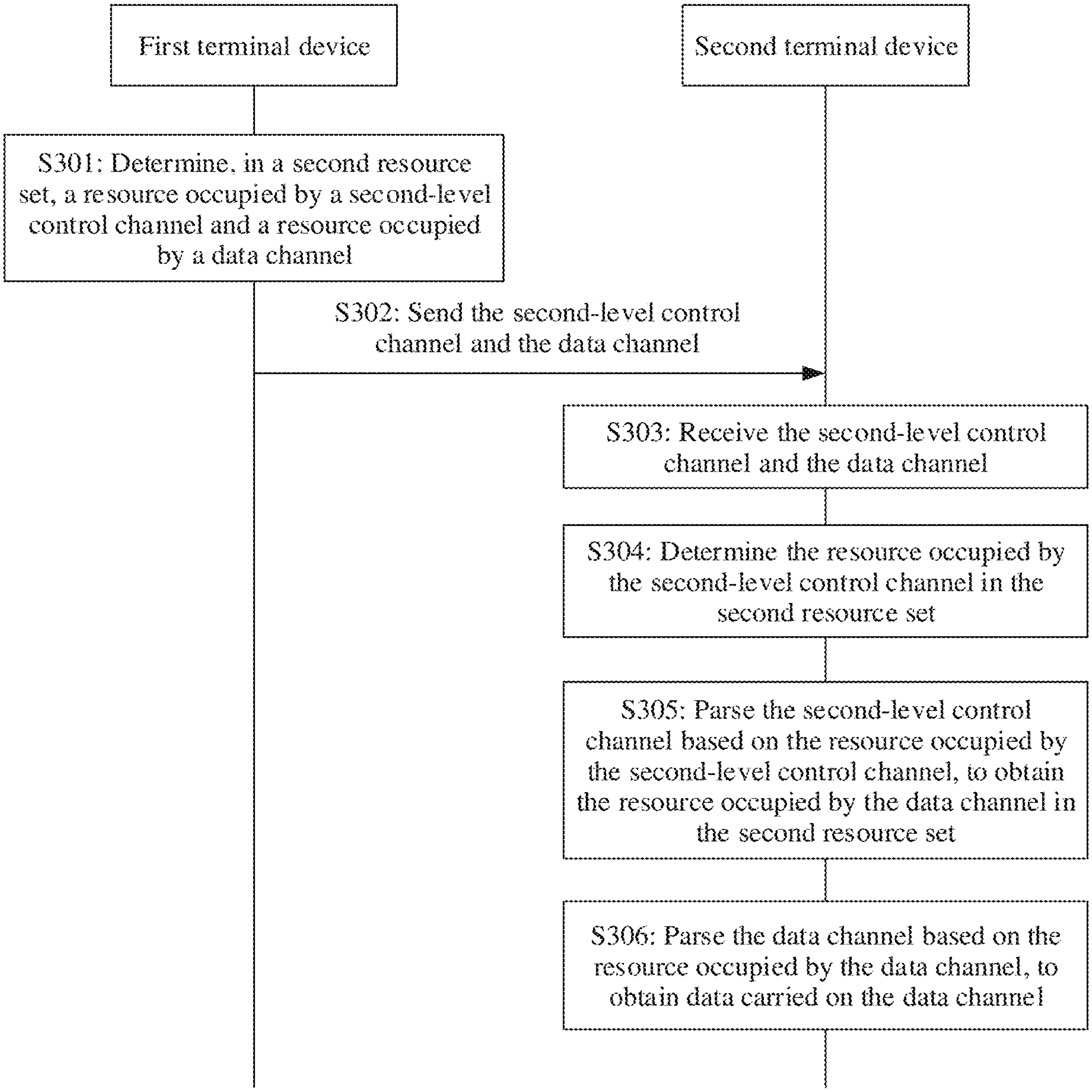

FIG. 3

METHOD FOR SENDING TWO LEVELS OF CONTROL CHANNELS, TERMINAL DEVICE, AND COMMUNICATIONS APPARATUS

CROSS-REFERENCE TO RELATED APPLICATIONS

This application is a continuation of International Application No. PCT/CN2019/119796, filed on Nov. 20, 2019, the disclosure of which is hereby incorporated by reference in its entirety.

TECHNICAL FIELD

This application relates to the communications field, and in particular, to a method for sending two levels of control channels, a terminal device, and a communications apparatus.

BACKGROUND

In a network using a long term evolution (LTE) technology proposed by the 3rd generation partnership project (3GPP), an internet-of-vehicles technology for vehicle-to-everything (V2X) communication is proposed. The V2X communication is communication between a vehicle and anything outside the vehicle, and includes a plurality of application scenarios such as vehicle-to-vehicle (V2V) communication, vehicle-to-pedestrian (V2P) communication, vehicle-to-infrastructure (V2I) communication, and vehicle-to-network (V2N) communication.

In existing LTE V2X communication, a resource mapping manner shown in FIG. 1 is used. A transmission resource scheduled once includes one subframe in time domain, and includes one or more consecutive sub-channels in frequency domain. Each sub-channel includes a plurality of consecutive resource blocks (RB), for example, 10 RBs. A physical sidelink control channel (PSCCH) occupies, in frequency domain, two consecutive RBs having lowest sequence numbers, and is used to transmit control information, for example, sidelink control information (SCI). A physical sidelink shared channel (PSSCH) occupies a remaining RB in a sub-channel in a frequency division multiplexing (FDM) manner, and is used to transmit data information. In the resource mapping manner, a size of a physical resource occupied by the PSCCH channel is fixed, and one time of data transmission is accompanied by one time of control information transmission. A receive end performs blind detection on all possible control channels by using a sub-channel as a granularity in an entire frequency domain range, and decodes a data channel based on correctly decoded control information, to obtain data information.

In new radio (NR) V2X communication, because a frame structure is changed, to support more service types, a length of control information is variable. Therefore, the foregoing resource mapping manner is no longer applicable.

SUMMARY

Embodiments of this application provide a method for sending two levels of control channels, a terminal device, and a communications apparatus; are applicable to fields such as V2X, an internet of vehicles, an intelligent connected vehicle, assisted driving, and intelligent driving; and can resolve a resource mapping problem of a second-level control channel to ensure reliability of the second-level control channel, and can effectively reduce a decoding delay of the second-level control channel.

To achieve the foregoing objective, the following technical solutions are used in this application:

According to a first aspect, a method for sending two levels of control channels is provided, and is used in a first terminal device. The method includes: determining, in a second resource set, a resource occupied by a second-level control channel and a resource occupied by a data channel, where the second resource set is located after a first resource set in time domain and is adjacent to the first resource set, and the second-level control channel occupies all symbols in the second resource set in time domain; and then sending the second-level control channel and the data channel, where an average transmit power of the second-level control channel is higher than an average transmit power of the data channel.

According to the method for sending two levels of control channels provided in the first aspect, the first terminal device may determine, in the second resource set that does not overlap the first resource set in time domain, the resource occupied by the second-level control channel and the resource occupied by the data channel, where the second-level control channel occupies all the time domain symbols in the second resource set, and the average transmit power of the second-level control channel is higher than the average transmit power of the data channel. That is, in a scenario in which power enhancement is performed on a first-level control channel, the second-level control channel can avoid a time domain symbol occupied by the first-level control channel, so that power enhancement is further performed on the second-level control channel, thereby improving a decoding success rate of the second-level control channel, and improving reliability of the second-level control channel. In addition, the second-level control channel occupies all the time domain symbols in the second resource set. Therefore, in a scenario in which power enhancement is performed on the second-level control channel, adverse impact of the second-level control channel on the data channel can be reduced, thereby ensuring reliability of the data channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, the first resource set includes a resource occupied by the first-level control channel, and the first-level control channel carries an aggregation level (AL) of the second-level control channel. Correspondingly, the method provided in the first aspect may further include: determining, based on the aggregation level and a minimum resource scheduling granularity of the second-level control channel, a quantity of resources occupied by the second-level control channel, to further determine a quantity of resources occupied by the data channel.

Optionally, the determining, based on the aggregation level and a minimum resource scheduling granularity of the second-level control channel, a quantity of resources occupied by the second-level control channel may include: determining a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the method provided in the first aspect may further include: determining, based on the quantity of resources occupied by the second-level control channel, a frequency domain position of the resource occupied by the second-level control channel in the second resource set. Specifically, the resource occupied by the second-level control channel may be determined in the second resource set according to a preset rule. For example, the second-level control channel may occupy, by starting from a resource block with a smallest number, one or more resource blocks in the second resource set in ascending order of resource block numbers, to reduce the resource overheads.

In a possible design method, multiple-input multiple-output MIMO (MIMO) coding, layer mapping, and resource mapping may be independently performed on each of the second-level control channel and the data channel. That is, after channel coding and rate matching are independently performed on each of the second-level control channel and the data channel, the MIMO coding, the layer mapping, and the resource mapping may be independently performed on the resources respectively occupied by the second-level control channel and the data channel, so that when the plurality of channels are included, a modulation and coding procedure of the first terminal device can be simplified, thereby improving efficiency.

Optionally, the method provided in the first aspect may further include: mapping, first in frequency domain and then in time domain, the second-level control channel on the resource occupied by the second-level control channel; and mapping, first in frequency domain and then in time domain, the data channel on the resource occupied by the data channel.

It should be noted that, because a demodulation parameter (for example, an MCS) and resource configuration information (for example, the aggregation level) of the second-level control channel are carried on the first-level control channel, the method provided in the first aspect may further include: sending the first-level control channel. The resource occupied by the first-level control channel is located in the first resource set, and is usually a resource preconfigured in a network or predefined in a protocol. In addition, a modulation and coding parameter of the first-level control channel is also preconfigured in a network or predefined in a protocol. That is, both resource configuration information and a demodulation and decoding parameter of the first-level control channel are known, and a terminal device that receives the first-level control channel, for example, a second terminal device provided in the following second aspect, may parse the first-level control channel based on the resource configuration information and the demodulation and decoding parameter of the first-level control channel, to obtain content, for example, the resource configuration information and the modulation and coding parameter of the second-level control channel, carried on the first-level control channel.

According to a second aspect, a method for receiving two levels of control channels is provided, and is used in a second terminal device. The method includes: receiving a second-level control channel and a data channel, where an average transmit power of the second-level control channel is higher than an average transmit power of the data channel; then determining a resource occupied by the second-level control channel in a second resource set, and parsing the second-level control channel based on the resource occupied by the second-level control channel, to obtain a resource occupied by the data channel in the second resource set, where the second resource set is located after a first resource set in time domain and is adjacent to the first resource set, and the second-level control channel occupies all symbols in the second resource set in time domain; and parsing the data channel based on the resource occupied by the data channel, to obtain data carried on the data channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, the first resource set includes a resource occupied by a first-level control channel, and the first-level control channel carries an aggregation level of the second-level control channel. Correspondingly, the method provided in the second aspect may further include: determining, based on the aggregation level and a minimum resource scheduling granularity of the second-level control channel, a quantity of resources occupied by the second-level control channel.

Optionally, the determining, based on the aggregation level and a minimum resource scheduling granularity of the second-level control channel, a quantity of resources occupied by the second-level control channel may include: determining a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the method provided in the second aspect may further include: determining, based on the quantity of resources occupied by the second-level control channel, a frequency domain position of the resource occupied by the second-level control channel in the second resource set. Specifically, the frequency domain position of the resource occupied by the second-level control channel may be determined in the second resource set according to a preset rule. For example, the second-level control channel may occupy, by starting from a resource block with a smallest number, one or more resource blocks in the second resource set in ascending order of resource block numbers. In this way, information indicating the frequency domain position of the resource occupied by the second-level control channel may not be transmitted, to reduce the resource overheads.

It should be noted that, because the second-level control channel carries a demodulation parameter and resource configuration information of the data channel, the second terminal device needs to first parse the second-level control channel, and then can parse the data channel.

In a possible design method, after FFT is performed and a CP is removed, each of the second-level control channel and the data channel may be parsed by performing a demodulation and decoding (demodulation & decoding) procedure in a reverse order of the modulation and coding procedure provided in the first aspect, to obtain content carried on the second-level control channel and the data carried on the data channel. The demodulation and decoding procedure for each of the second-level control channel and the data channel may sequentially include the following steps: resource demapping, MIMO decoding, layer demapping, descrambling, channel demultiplexing, rate de-matching, and channel decoding.

Optionally, corresponding to the mapping manners that are of the second-level control channel and the data channel and that are provided in the first aspect, the method provided in the second aspect may further include: demapping, first in frequency domain and then in time domain, the second-level control channel on the resource occupied by the second-level control channel; and demapping, first in frequency domain and then in time domain, the data channel on the resource occupied by the data channel.

It should be noted that, because resource configuration information (for example, the aggregation level) and a demodulation parameter (for example, an MCS) of the second-level control channel are carried on the first-level control channel, the second terminal device needs to first parse the first-level control channel, and then parse the second-level control channel. Therefore, corresponding to the sending, of the first-level control channel, provided in the first aspect, the method provided in the second aspect further includes: receiving and parsing the first-level control channel.

For technical effects of the method provided in the second aspect, refer to the technical effects of the method provided in the first aspect. Details are not described herein again.

According to a third aspect, a method for sending two levels of control channels is provided. The method includes: selecting a resource occupied by a second-level control channel from a first resource set or a second resource set, where the first resource set includes a resource occupied by a first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain; and then sending the first-level control channel and the second-level control channel.

The resource occupied by the first-level control channel is located in the first resource set, and is usually a resource preconfigured in a network or predefined in a protocol. In addition, a modulation and coding parameter of the first-level control channel is also preconfigured in a network or predefined in a protocol. That is, both resource configuration information and a demodulation and decoding parameter of the first-level control channel are known, and a terminal device that receives the first-level control channel, for example, a second terminal device provided in the following fourth aspect, may parse the first-level control channel based on the resource configuration information and the demodulation and decoding parameter of the first-level control channel, to obtain content carried on the first-level control channel, for example, resource configuration information and a modulation and coding parameter of the second-level control channel.

According to the method for sending two levels of control channels provided in the third aspect, a first terminal device may select the resource occupied by the second-level control channel from the first resource set or the second resource set. When power enhancement is not performed on the first-level control channel, the resource occupied by the second-level control channel may be selected from the first resource set; or when power enhancement is performed on the first-level control channel, the resource occupied by the second-level control channel may be selected from the second resource set, so that reliability of the second-level control channel is ensured, and a decoding delay of the second-level control channel can be reduced.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, the selecting a resource occupied by a second-level control channel from a first resource set or a second resource set may include: when a difference between a total quantity of resources of the first resource set and a quantity of resources occupied by the first-level control channel is greater than or equal to a quantity of resources occupied by the second-level control channel, selecting the resource occupied by the second-level control channel from the first resource set, to further reduce the decoding delay of the second-level control channel.

Optionally, a time domain start symbol of the resource occupied by the second-level control channel and a time domain start symbol of the resource occupied by the first-level control channel may be a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design method, the selecting a resource occupied by a second-level control channel from a first resource set or a second resource set may include: when a difference between a total quantity of resources of the first resource set and a quantity of resources occupied by the first-level control channel is less than a quantity of resources occupied by the second-level control channel, selecting the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that the reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

It should be noted that the first-level control channel and the second-level control channel serve data transmission, and the second-level control channel carries a demodulation parameter and resource configuration information of a data channel. Therefore, in a possible design method, the method provided in the third aspect may further include: obtaining, based on the resource occupied by the second-level control channel, a resource occupied by the data channel, and sending the data channel on the resource occupied by the data channel, where the resource occupied by the data channel may include: a resource that is selected from the first resource set and the second resource set and that is other than the resource occupied by the first-level control channel, the resource occupied by the second-level control channel, and a resource occupied by a demodulation reference signal.

In a possible design method, multiple-input multiple-output MIMO coding, layer mapping, and resource mapping may be independently performed on each of the second-level control channel and the data channel. That is, after channel coding and rate matching are independently performed on each of the second-level control channel and the data channel, the MIMO coding, the layer mapping, and the resource mapping may be independently performed on the resources respectively occupied by the second-level control channel and the data channel, so that a modulation and coding procedure of the first terminal device can be simplified, thereby improving efficiency.

Optionally, the method provided in the third aspect may further include: mapping, first in frequency domain and then in time domain, the second-level control channel on the resource occupied by the second-level control channel; and mapping, first in frequency domain and then in time domain, the data channel on the resource occupied by the data channel.

According to a fourth aspect, a method for receiving two levels of control channels is provided, and is used in a second terminal device. The method includes: receiving a first-level control channel and a second-level control channel; then parsing the first-level control channel to obtain a resource occupied by the second-level control channel, where specifically, the resource occupied by the second-level control channel is selected from a first resource set or a second resource set, where the first resource set includes a resource occupied by the first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain; and obtaining, through parsing based on the resource occupied by the second-level control channel, content carried on the second-level control channel.

The resource occupied by the first-level control channel is located in the first resource set, and is usually a resource preconfigured in a network or predefined in a protocol. In addition, a modulation and coding parameter of the first-level control channel is also preconfigured in a network or predefined in a protocol. That is, both resource configuration information and a demodulation and decoding parameter of the first-level control channel are known, and a terminal device that receives the first-level control channel, for example, the second terminal device provided in the following second aspect, may parse the first-level control channel based on the resource configuration information and the demodulation and decoding parameter of the first-level control channel, to obtain content carried on the first-level control channel, for example, resource configuration information and a modulation and coding parameter of the second-level control channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, that the resource occupied by the second-level control channel is selected from a first resource set or a second resource set may include: when a difference between a total quantity of resources of the first resource set and a quantity of resources occupied by the first-level control channel is greater than or equal to a quantity of resources occupied by the second-level control channel, the resource occupied by the second-level control channel is selected from the first resource set, to further reduce a decoding delay of the second-level control channel.

Optionally, a time domain start symbol of the resource occupied by the second-level control channel and a time domain start symbol of the resource occupied by the first-level control channel may be a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design method, that the resource occupied by the second-level control channel is selected from a first resource set or a second resource set may include: when a difference between a total quantity of resources of the first resource set and a quantity of resources occupied by the first-level control channel is less than a quantity of resources occupied by the second-level control channel, the resource occupied by the second-level control channel is selected from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

It should be noted that the first-level control channel and the second-level control channel serve data transmission, and the second-level control channel carries a demodulation parameter and resource configuration information of a data channel. Therefore, in a possible design method, corresponding to the "obtaining, based on the resource occupied by the second-level control channel, a resource occupied by the data channel, and sending the data channel on the resource occupied by the data channel" provided in the third aspect, the method provided in the fourth aspect may further include: obtaining, based on the resource occupied by the second-level control channel, a resource occupied by the data channel and a demodulation parameter; and parsing the data channel based on the resource occupied by the data channel and the demodulation parameter, to obtain data carried on the data channel, where the resource occupied by the data channel may include: a resource that is selected from the first resource set and the second resource set and that is other than the resource occupied by the first-level control channel, the resource occupied by the second-level control channel, and a resource occupied by a demodulation reference signal of the data channel.

In a possible design method, after FFT is performed and a CP is removed, each of the second-level control channel and the data channel may be parsed by performing a demodulation and decoding procedure in a reverse order of the modulation and coding procedure provided in the third aspect, to obtain the content carried on the second-level control channel and the data carried on the data channel. The demodulation and decoding procedure for each channel may sequentially include the following steps: resource demapping, MIMO decoding, layer demapping, descrambling, channel demultiplexing, rate de-matching, and channel decoding.

It should be noted that, because the first-level control channel carries a demodulation parameter and the resource configuration information of the second-level control channel, the first-level control channel needs to be parsed first, and then the second-level control channel can be parsed. Similarly, because the second-level control channel carries the demodulation parameter and the resource configuration information of the data channel, the second-level control channel needs to be parsed first, and then the data channel can be parsed.

Optionally, corresponding to the mapping manners that are of the second-level control channel and the data channel and that are provided in the third aspect, the method provided in the fourth aspect may further include: demapping, first in frequency domain and then in time domain, the second-level control channel on the resource occupied by the second-level control channel; and demapping, first in frequency domain and then in time domain, the data channel on the resource occupied by the data channel.

For technical effects of the method provided in the fourth aspect, refer to the technical effects of the method provided in the third aspect. Details are not described herein again.

According to a fifth aspect, a terminal device is provided. The terminal device includes a processing module and a transceiver module. The processing module is configured to determine, in a second resource set, a resource occupied by a second-level control channel and a resource occupied by a data channel, where the second resource set is located after a first resource set in time domain and is adjacent to the first resource set, and the second-level control channel occupies all symbols in the second resource set in time domain. The transceiver module is configured to send the second-level control channel and the data channel, where an average transmit power of the second-level control channel is higher than an average transmit power of the data channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the first resource set includes a resource occupied by a first-level control channel, and the first-level control channel carries an aggregation level of the second-level control channel. Correspondingly, the processing module is further configured to determine, based on the aggregation level and a minimum resource scheduling granularity of the second-level control channel, a quantity of resources occupied by the second-level control channel, to further determine a quantity of resources occupied by the data channel.

Optionally, the processing module is further configured to determine a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the processing module is further configured to determine, based on the quantity of resources occupied by the second-level control channel, a frequency domain position of the resource occupied by the second-level control channel in the second resource set. Specifically, the resource occupied by the second-level control channel may be determined in the second resource set according to a preset rule. For example, the second-level control channel may occupy, by starting from a resource block with a smallest number, one or more resource blocks in the second resource set in ascending order of resource block numbers, to reduce resource overheads.

In a possible design, multiple-input multiple-output MIMO coding, layer mapping, and resource mapping may be independently performed on each of the second-level control channel and the data channel. That is, after channel coding and rate matching are independently performed on each of the second-level control channel and the data channel, the MIMO coding, the layer mapping, and the resource mapping may be independently performed on the resources respectively occupied by the second-level control channel and the data channel, so that when the plurality of channels are included, a modulation and coding procedure of a first terminal device can be simplified, thereby improving efficiency.

Optionally, the processing module is further configured to: map, first in frequency domain and then in time domain, the second-level control channel on the resource occupied by the second-level control channel; and map, first in frequency domain and then in time domain, the data channel on the resource occupied by the data channel.

Optionally, the terminal device provided in the fifth aspect may further include a storage module, and the storage module stores a program or an instruction. When the processing module executes the program or the instruction, the terminal device provided in the fifth aspect may perform the method provided in any possible implementation of the first aspect.

It should be noted that the terminal device provided in the fifth aspect may be an independent terminal device, or may be a chip or a chip system disposed in the terminal device. This is not limited in this application.

For technical effects of the terminal device provided in the fifth aspect, refer to the technical effects of the method provided in the first aspect. Details are not described herein again.

According to a sixth aspect, a terminal device is provided. The terminal device includes a processing module and a transceiver module. The transceiver module is configured to receive a second-level control channel and a data channel, where an average transmit power of the second-level control channel is higher than an average transmit power of the data channel. The processing module is configured to: determine a resource occupied by the second-level control channel in a second resource set, and parse the second-level control channel based on the resource occupied by the second-level control channel, to obtain a resource occupied by the data channel in the second resource set, where the second resource set is located after a first resource set in time domain and is adjacent to the first resource set, and the second-level control channel occupies all symbols in the second resource set in time domain. The processing module is further configured to parse the data channel based on the resource occupied by the data channel, to obtain data carried on the data channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the first resource set includes a resource occupied by a first-level control channel, and the first-level control channel carries an aggregation level of the second-level control channel. Correspondingly, the processing module is further configured to determine, based on the aggregation level and a minimum resource scheduling granularity of the second-level control channel, a quantity of resources occupied by the second-level control channel, to further determine a quantity of resources occupied by the data channel.

Optionally, the processing module is further configured to determine a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the processing module is further configured to determine, based on the quantity of resources occupied by the second-level control channel, a frequency domain position of the resource occupied by the second-level control channel in the second resource set. Specifically, the resource occupied by the second-level control channel may be determined in the second resource set according to a preset rule. For example, the second-level control channel may occupy, by starting from a resource block with a smallest number, one or more resource blocks in the second resource set in ascending order of resource block numbers. In this way, information indicating the frequency domain position of the resource occupied by the second-level control channel may not be transmitted, to reduce the resource overheads.

In a possible design, after FFT is performed and a CP is removed, each of the second-level control channel and the data channel may be parsed by performing a demodulation and decoding procedure in a reverse order of the modulation and coding procedure provided in the fifth aspect, to obtain content carried on the second-level control channel and content carried on the data channel. The demodulation and decoding procedure for each channel may sequentially include the following steps: resource demapping, MIMO decoding, layer demapping, descrambling, channel demultiplexing, rate de-matching, and channel decoding.

It should be noted that, because the second-level control channel carries a demodulation parameter and resource configuration information of the data channel, the second-level control channel needs to be parsed first, and then the data channel can be parsed.

Optionally, the processing module is further configured to: demap, first in frequency domain and then in time domain, the second-level control channel on the resource occupied by the second-level control channel; and demap, first in frequency domain and then in time domain, the data channel on the resource occupied by the data channel.

It should be noted that, because resource configuration information (for example, the aggregation level) and a demodulation parameter (for example, an MCS) of the second-level control channel are carried on the first-level control channel, the terminal device provided in the sixth aspect needs to first parse the first-level control channel, and then parse the second-level control channel. Therefore, the transceiver module is further configured to receive the first-level control channel, and the processing module is further configured to parse the first-level control channel.

The resource occupied by the first-level control channel is located in the first resource set, and is usually a resource preconfigured in a network or predefined in a protocol.

Optionally, the terminal device provided in the sixth aspect may further include a storage module, and the storage module stores a program or an instruction. When the processing module executes the program or the instruction, the terminal device provided in the sixth aspect may perform the method provided in any possible implementation of the second aspect.

It should be noted that the terminal device provided in the sixth aspect may be an independent terminal device, or may be a chip or a chip system disposed in the terminal device. This is not limited in this application.

For technical effects of the terminal device provided in the sixth aspect, refer to the technical effects of the method provided in the first aspect. Details are not described herein again.

According to a seventh aspect, a terminal device is provided. The terminal device includes a processing module and a transceiver module. The processing module is configured to select a resource occupied by a second-level control channel from a first resource set or a second resource set, where the first resource set includes a resource occupied by a first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain. The transceiver module is configured to send the first-level control channel and the second-level control channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the processing module is further configured to: when a difference between a total quantity of resources of the first resource set and a quantity of resources occupied by the first-level control channel is greater than or equal to a quantity of resources occupied by the second-level control channel, select the resource occupied by the second-level control channel from the first resource set, to further reduce a decoding delay of the second-level control channel.

Optionally, a time domain start symbol of the resource occupied by the second-level control channel and a time domain start symbol of the resource occupied by the first-level control channel are a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design, the processing module is further configured to: when a difference between a total quantity of resources of the first resource set and a quantity of resources occupied by the first-level control channel is less than a quantity of resources occupied by the second-level control channel, select the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

In a possible design, multiple-input multiple-output MIMO coding, layer mapping, and resource mapping may be independently performed on each of the second-level control channel and the data channel. That is, after channel coding and rate matching are independently performed on each of the second-level control channel and the data channel, the MIMO coding, the layer mapping, and the resource mapping may be independently performed on the resources respectively occupied by the second-level control channel and the data channel, so that a modulation and coding procedure of the terminal device provided in the seventh aspect can be simplified, thereby improving efficiency.

Optionally, the processing module is further configured to: map, first in frequency domain and then in time domain, the second-level control channel on the resource occupied by the second-level control channel; and map, first in frequency domain and then in time domain, the data channel on the resource occupied by the data channel.

Optionally, the terminal device provided in the seventh aspect may further include a storage module, and the storage module stores a program or an instruction. When the processing module executes the program or the instruction, the terminal device provided in the seventh aspect may perform the method provided in any possible implementation of the third aspect.

It should be noted that the terminal device provided in the seventh aspect may be an independent terminal device, or may be a chip or a chip system disposed in the terminal device. This is not limited in this application.

For technical effects of the terminal device provided in the seventh aspect, refer to the technical effects of the method provided in the third aspect. Details are not described herein again.

According to an eighth aspect, a terminal device is provided. The terminal device includes a processing module and a transceiver module. The transceiver module is configured to receive a first-level control channel and a second-level control channel. The processing module is configured to parse the first-level control channel to obtain a resource occupied by the second-level control channel. Specifically, the processing module is configured to select the resource occupied by the second-level control channel from a first resource set or a second resource set, where the first resource set includes a resource occupied by the first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain. The processing module is further configured to parse, based on the resource occupied by the second-level control channel, content carried on the second-level control channel. The resource occupied by the first-level control channel is located in the first resource set, and is usually a resource preconfigured in a network or predefined in a protocol.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the processing module is further configured to: when a difference between a total quantity of resources of the first resource set and a quantity of resources occupied by the first-level control channel is greater than or equal to a quantity of resources occupied by the second-level control channel, select the resource occupied by the second-level control channel from the first resource set, to further reduce a decoding delay of the second-level control channel.

Optionally, a time domain start symbol of the resource occupied by the second-level control channel and a time domain start symbol of the resource occupied by the first-level control channel may be a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design, the processing module is further configured to: when a difference between a total quantity of resources of the first resource set and a quantity of resources occupied by the first-level control channel is less than a quantity of resources occupied by the second-level control channel, select the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

It should be noted that the first-level control channel and the second-level control channel serve data transmission, and the second-level control channel carries a demodulation parameter and resource configuration information of a data channel. Therefore, in a possible design, the processing module is further configured to: obtain, based on the resource occupied by the second-level control channel, a resource occupied by the data channel and the demodulation parameter; and parse the data channel based on the resource occupied by the data channel and the demodulation parameter, to obtain data carried on the data channel. The resource occupied by the data channel may include: a resource that is selected from the first resource set and the second resource set and that is other than the resource occupied by the first-level control channel, the resource occupied by the second-level control channel, and a resource occupied by a demodulation reference signal of the data channel.

In a possible design, after FFT is performed and a CP is removed, each of the second-level control channel and the data channel may be parsed by performing a demodulation and decoding procedure in a reverse order of the modulation and coding procedure provided in the seventh aspect, to obtain content carried on the second-level control channel and the data carried on the data channel. The demodulation and decoding procedure for each channel may sequentially include the following steps: resource demapping, MIMO decoding, layer demapping, descrambling, channel demultiplexing, rate de-matching, and channel decoding.

It should be noted that, because the first-level control channel carries a demodulation parameter and resource configuration information of the second-level control channel, the first-level control channel needs to be parsed first, and then the second-level control channel can be parsed. Similarly, because the second-level control channel carries the demodulation parameter and the resource configuration information of the data channel, the second-level control channel needs to be parsed first, and then the data channel can be parsed.

Optionally, the processing module is further configured to: demap, first in frequency domain and then in time domain, the second-level control channel on the resource occupied by the second-level control channel; and demap, first in frequency domain and then in time domain, the data channel on the resource occupied by the data channel.

For technical effects of the terminal device provided in the eighth aspect, refer to the technical effects of the method provided in the third aspect. Details are not described herein again.

According to a ninth aspect, a communications apparatus is provided. The communications apparatus includes at least one processor, and the at least one processor is coupled to at least one memory. The at least one processor is configured to execute a computer program or an instruction stored in the at least one memory, so that the communications apparatus provided in the ninth aspect performs the method provided in any possible implementation of the first aspect to the fourth aspect.

According to a tenth aspect, a communications apparatus is provided. The communications apparatus includes a processor and an interface circuit. The interface circuit is configured to: receive a code instruction and transmit the code instruction to the processor. The processor is configured to run the code instruction to perform the method provided in any possible implementation of the first aspect to the fourth aspect.

According to an eleventh aspect, a chip system is provided. The chip system includes a processor, the processor is coupled to a memory, and the memory is configured to store a program or an instruction. The chip system may further include an interface circuit, and the interface circuit is configured to receive a code instruction and transmit the code instruction to the processor. When the program or the instruction is executed by the processor, the chip system is enabled to implement the method provided in any possible implementation of the first aspect to the fourth aspect.

Optionally, there may be one or more processors in the chip system. The processor may be implemented by using hardware, or may be implemented by using software. When the processor is implemented by using hardware, the processor may be a logic circuit, an integrated circuit, or the like. When the processor is implemented by using software, the processor may be a general purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a twelfth aspect, a readable storage medium is provided. The readable storage medium is configured to store an instruction. When the instruction is executed, the method provided in any possible implementation of the first aspect to the fourth aspect is implemented.

According to a thirteenth aspect, a computer program product is provided. The computer program product includes computer program code, and when the computer program code is run on a computer, the computer is enabled to perform the method provided in any possible implementation of the first aspect to the fourth aspect.

According to a fourteenth aspect, a communications system is provided. The communications system includes a sending terminal such as the foregoing first terminal device, and one or more receiving terminals such as the foregoing second terminal device. The sending terminal is configured to perform the method performed by the first terminal device in the first aspect to the fourth aspect, and the receiving terminal is configured to perform the method performed by the second terminal device in the first aspect to the fourth aspect. Any one of the at least two terminal devices may be an independent terminal device, for example, a mobile phone; or may be an apparatus, a module, or another component disposed inside the terminal device, for example, a chip, a chip system, or an in-vehicle module.

Optionally, the communications system may further include a network device, such as a base station or a road side unit (RSU).

BRIEF DESCRIPTION OF THE DRAWINGS

FIG. 2 is a schematic architectural diagram of a communications system according to an embodiment of this application;

FIG. 3 is a first schematic flowchart of a method for sending two levels of control channels according to an embodiment of this application;

DETAILED DESCRIPTION OF ILLUSTRATIVE EMBODIMENTS

Figure 1:
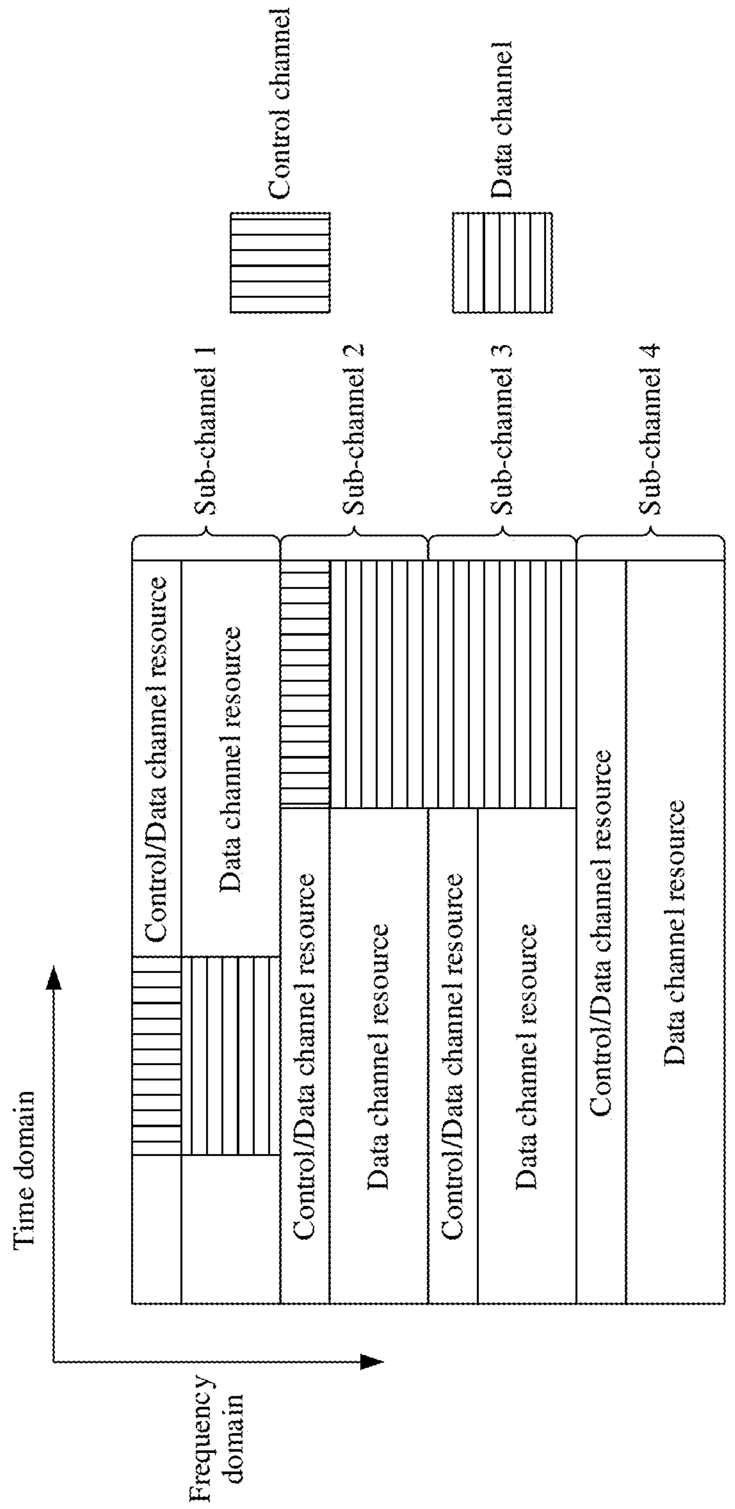
FIG. 1 is a schematic diagram of a resource mapping manner of LTE V2X.

To make objectives, technical solutions, and advantages of embodiments of this application clearer, the following further describes the embodiments of this application in detail with reference to accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in the embodiments of this application, the terms such as "for example" and "such as" are used to represent giving an example, an illustration, or a description. Any embodiment or design solution described as an "example" in this application should not be explained as being more preferred or having more advantages than another embodiment or design solution. Exactly, the term "for example" is used to present a concept in a specific manner.

In the embodiments of this application, the terms "information", "signal", "message", "channel", and "signaling" may be interchangeably used sometimes. It should be noted that meanings expressed by the terms are consistent when differences between the terms are not emphasized. "Of (of)", "relevant to (corresponding to or relevant to)", and "corresponding to (corresponding)" may be interchangeably used sometimes. It should be noted that meanings expressed by the terms are consistent when differences are not emphasized.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems.

The technical solutions in the embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communications system, a 5th generation (5G) system or a new radio (NR) system, a future communications system, or another similar communications system.

The technical solutions in the embodiments of this application may be used in technical fields such as unmanned driving, assisted driving (ADAS), intelligent driving, connected driving, intelligent network driving, car sharing, a smart/intelligent car, a digital car, an unmanned car (unmanned car/driverless car/pilotless car/automobile), an internet of vehicles (boy), a self-driving car (self-driving car/autonomous car), a cooperative vehicle infrastructure (CVIS), an intelligent transportation system (ITS), and vehicular communication.

In addition, the technical solutions provided in the embodiments of this application may be used on a cellular link, or may be used on a link between devices, for example, a device-to-device (D2D) link. The D2D link or a V2X link may also be referred to as a sidelink, a secondary link, or the like. In the embodiments of this application, the foregoing terms all refer to a link established between devices of a same type, and have a same meaning. The link established between the devices of the same type may be a link between independent terminal devices, or may be a link between base stations, or may be a link between relay nodes, or the like. This is not limited in the embodiments of this application. For the link between the terminal devices, there is a D2D link defined in 3GPP release (Rel)-12/13, and there is further a V2X link that is from a vehicle to a vehicle, a vehicle to a mobile, or a vehicle to any entity and that is defined by 3GPP for an internet of vehicles. The V2X link includes a V2X link defined in 3GPP Rel-14/15, and further includes a V2X link defined in Rel-16, which is currently being researched by the 3GPP, and an NR system-based V2X link in a later release.

FIG. 2 is a schematic diagram of a network architecture of a communications system in which an embodiment of this application is used. It should be noted that some scenarios in the embodiments of this application are described by using a scenario in the communications system shown in FIG. 2 as an example. It should be noted that the solutions in the embodiments of this application may also be used in another mobile communications system, and a corresponding name may also be replaced with a name of a corresponding function in the another mobile communications system.

As shown in FIG. 2, the communications system includes a first terminal device and a second terminal device. The terminal devices may directly communicate with each other through a PC5 interface, and a direct communications link between the terminal devices is a sidelink (SL). Sidelink-based communication may use at least one of the following channels: a physical sidelink shared channel (PSSCH), used to carry data; and a physical sidelink control channel (PSCCH), used to carry sidelink control information (SCI).

Optionally, the communications system further includes a network device (not shown in FIG. 2), configured to provide timing synchronization and resource scheduling for the terminal device. The network device may communicate with at least one terminal device (for example, the first terminal device) through a Uu interface. A communications link between the network device and the terminal device includes an uplink (UL) and a downlink (DL). The terminal devices may alternatively indirectly communicate with each other through forwarding performed by the network device. For example, the first terminal device may send data to the network device through the Uu interface, the network device sends the data to an application server for processing, then the application server delivers the processed data to the network device, and the network device sends the processed data to the second terminal device. In a Uu interface-based communication manner, a network device that forwards uplink data from the first terminal device to the application server and a network device that forwards downlink data delivered by the application server to the second terminal device may be a same network device, or may be different network devices, and may be determined by the application server.

The network device may be an access network device, for example, a base station. The access network device corresponds to different devices in different systems. For example, in a 5G system, the access network device corresponds to an access network device, for example, a gNB, in 5G. Although only the first terminal device and the second terminal device are shown in FIG. 2, it should be understood that the network device may serve a plurality of terminal devices, and a quantity of terminal devices in the communications system is not limited in the embodiments of this application. Similarly, the terminal device in FIG. 2 is described by using a vehicle-mounted terminal device or a vehicle as an example. It should further be understood that the terminal device in the embodiments of this application is not limited thereto, and the terminal device may alternatively be an in-vehicle module, a road side unit, or a pedestrian handheld device. It should be understood that the embodiments of this application are not limited to being used in a 4G or 5G system, and may further used in a subsequently evolved communications system.

In the following, some terms in the embodiments of this application are described, to help a person skilled in the art have a better understanding.

(1) Terminal Device

The terminal device may also be referred to as user equipment (UE), a mobile station (MS), a mobile terminal (MT), or the like, and is a device that provides voice and/or data connectivity for a user. The terminal device may communicate with a core network through a radio access network (RAN), and exchange a voice and/or data with the RAN. For example, the terminal device may be a handheld device, a vehicle-mounted device, or vehicle user equipment that has a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, or a wireless terminal in a smart home. The terminal device in the embodiments of this application may alternatively be an in-vehicle module, an in-vehicle component, an in-vehicle chip, or an in-vehicle unit that is built in a vehicle as one or more components or units. The vehicle may implement a method in this application by using the in-vehicle module, the in-vehicle component, the in-vehicle chip, or the in-vehicle unit that is built in the vehicle.

(2) Network Device

The network device is a device that is in a network and that is configured to connect a terminal device to a wireless network. The network device may be a node in a radio access network, and may also be referred to as a base station or a radio access network (RAN) node (or device). The network device may be configured to mutually convert a received over-the-air frame and an internet protocol (IP) packet, and serve as a router between the terminal device and a remaining portion of the access network, where the remaining portion of the access network may include an IP network. The network device may further coordinate attribute management of an air interface. For example, the network device may include an evolved NodeB (NodeB, eNB, or e-NodeB, evolutional Node B) in a long term evolution (LTE) system or an LTE-advanced (LTE-A) system, for example, a micro eNodeB eNB in a heterogeneous network scenario and a conventional macro eNodeB eNB; or may include a next generation NodeB (gNB) in a 5th generation (5G) new radio (NR) system; or may include a transmission reception point (TRP), a home base station (for example, a home evolved NodeB or a home Node B, HNB), a baseband unit (BBU), a baseband pool BBU pool, or a Wi-Fi access point (AP); or may include a centralized unit (CU) and a distributed unit (DU) in a cloud access network (CloudRAN) system. This is not limited in the embodiments of this application. For another example, a network device in a V2X technology is a road side unit (RSU). The RSU may be a fixed infrastructure entity supporting a V2X application, and may exchange a message with another entity supporting the V2X application.

(3) Two Levels of Control Channels and Data Channel

In the embodiments of this application, there are two types of control information: first control information and second control information. Correspondingly, there are two levels of control channels in one time unit, and the two levels of control channels are respectively used to carry the first control information and the second control information. The time unit is a set of resources scheduled for one time of data transmission.

Specifically, one time unit may include one or more consecutive sub-channels (sub-channel) in frequency domain, and one sub-channel may include several consecutive RBs in frequency domain. One time unit may include one or more time units in time domain. The time unit may include a plurality of possible time granularities such as a slot, a mini-slot, a subframe, a radio frame, and a transmission time interval (TTI). It should be understood that a bandwidth of the time unit is not specifically limited in the embodiments of this application. A quantity of sub-channels included in the time unit and a size of each sub-channel may be configured or preconfigured by a network device.

The first control information is applicable to scenarios such as broadcast, unicast, and multicast, and may be basic control information required for V2X communication. For example, the first control information may include a destination user ID (destination identity), a data channel frequency domain bandwidth, resource reservation information, an initial transmission time interval, and a retransmission time interval at an L1 layer. The first control information is carried on a first-level control channel, and the first-level control channel may be, for example, a first-level PSCCH channel.

The second control information is applicable to scenarios such as unicast and multicast, and may be additional link maintenance information required in the scenarios such as unicast and multicast, to improve link reliability. For example, the second control information may include a modulation and coding scheme (MCS) of a data channel, a hybrid automatic repeat request (HARQ) version number of the data channel, and a new transmission or retransmission indication of the data channel. The second control information is carried on a second-level control channel, and the second-level control channel may be, for example, a second-level PSCCH channel. It should be understood that in a broadcast scenario, a first terminal device may send only the first control information to a second terminal device. In unicast and multicast scenarios, a first terminal device needs to send the first control information and the second control information to a second terminal device.

Data may be specific service data sent by the first terminal device to the second terminal device in broadcast, unicast, and multicast scenarios and the like. The data is carried on the data channel in the time unit, and the data channel may be, for example, a PSSCH channel. For example, if both the first terminal device and the second terminal device are vehicles, the first terminal device may send some information, such as a location, a speed, an intention (including turning, paralleling, and backing), and a posture (such as an uphill or a downhill), of the first terminal device to the second terminal device.

It should be noted that, terms "system" and "network" in the embodiments of this application may be used interchangeably. "A plurality of" means two or more. In view of this, "a plurality of" may also be understood as "at least two" in the embodiments of this application. "At least one" may be understood as one or more, for example, understood as one, two, or more. For example, "include at least one" means including one, two, or more, and does not limit which items are included. For example, if "include at least one of A, B, and C", A, B, C, A and B, A and C, B and C, or A and B and C may be included. Similarly, understanding of descriptions such as "at least one type" is similar to the foregoing understanding. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between associated objects, unless otherwise specifically stated.

Unless otherwise stated, in the embodiments of this application, ordinal numbers such as "first" and "second" are used to distinguish between a plurality of objects, and not intended to limit an order, a time sequence, a priority, or importance of the plurality of objects. In addition, descriptions of "first" and "second" do not indicate that objects are definitely different.

FIG. 3 is a first schematic flowchart of a method for sending two levels of control channels according to an embodiment of this application. The method for sending two levels of control channels is applicable to the communications system shown in FIG. 2, to implement communication between the first terminal device and the second terminal device. The following describes in detail the method for sending two levels of control channels provided in the embodiments of this application by using an example in which the first terminal device is a sending terminal and the second terminal device is a receiving terminal.

As shown in FIG. 3, the method includes S301 to S306.

S301: The first terminal device determines, in a second resource set, a resource occupied by a second-level control channel and a resource occupied by a data channel.

Figure 4:
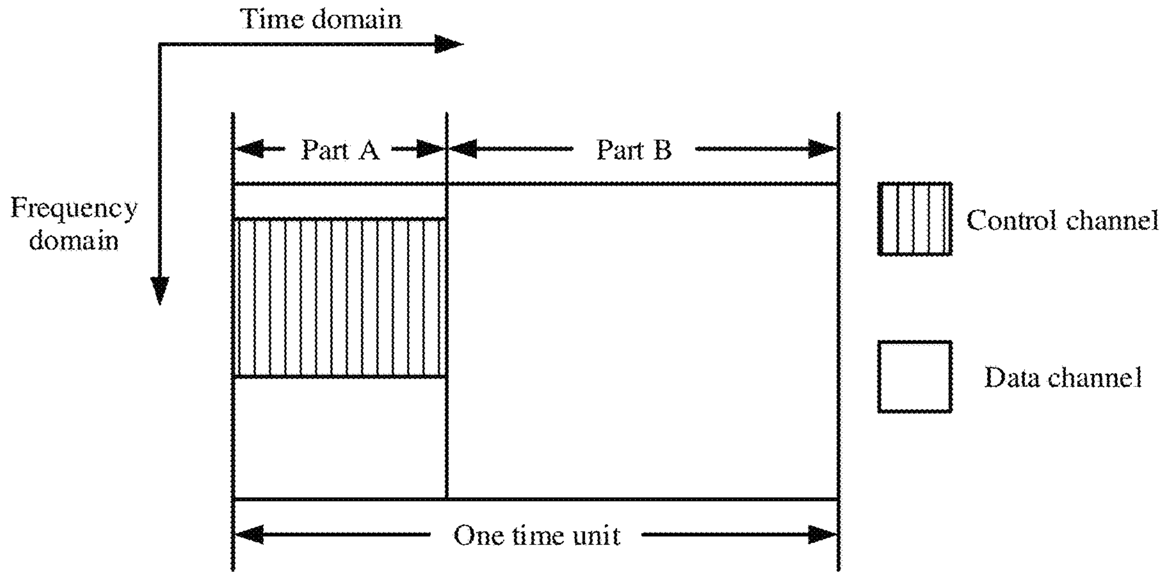
FIG. 4 is a schematic diagram of a frame structure of a time unit according to an embodiment of this application.

For example, FIG. 4 is a schematic diagram of a frame structure of a time unit according to an embodiment of this application. FIG. 4 shows only a first-level control channel and a data channel. In a part A shown in FIG. 4, the first-level control channel and the data channel are mapped to all symbols in the part A in a frequency division multiplexing manner. In a part B shown in FIG. 4, there is only the data channel, and there is no first-level control channel. A resource to which first control information is mapped in the time unit is a resource occupied by the first-level control channel, and may be preconfigured by a network device.

Figure 5:
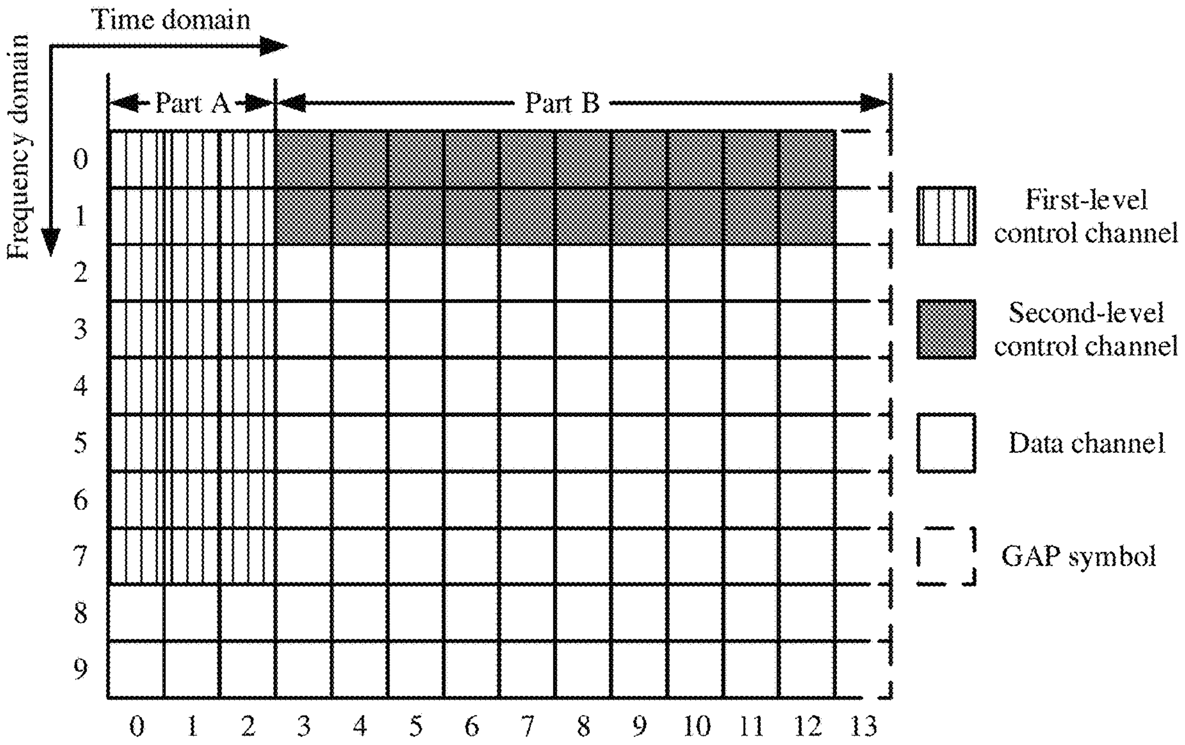
FIG. 5 is a first schematic diagram of resource distribution based on the frame structure shown in FIG. 4 according to an embodiment of this application.
Figure 6:
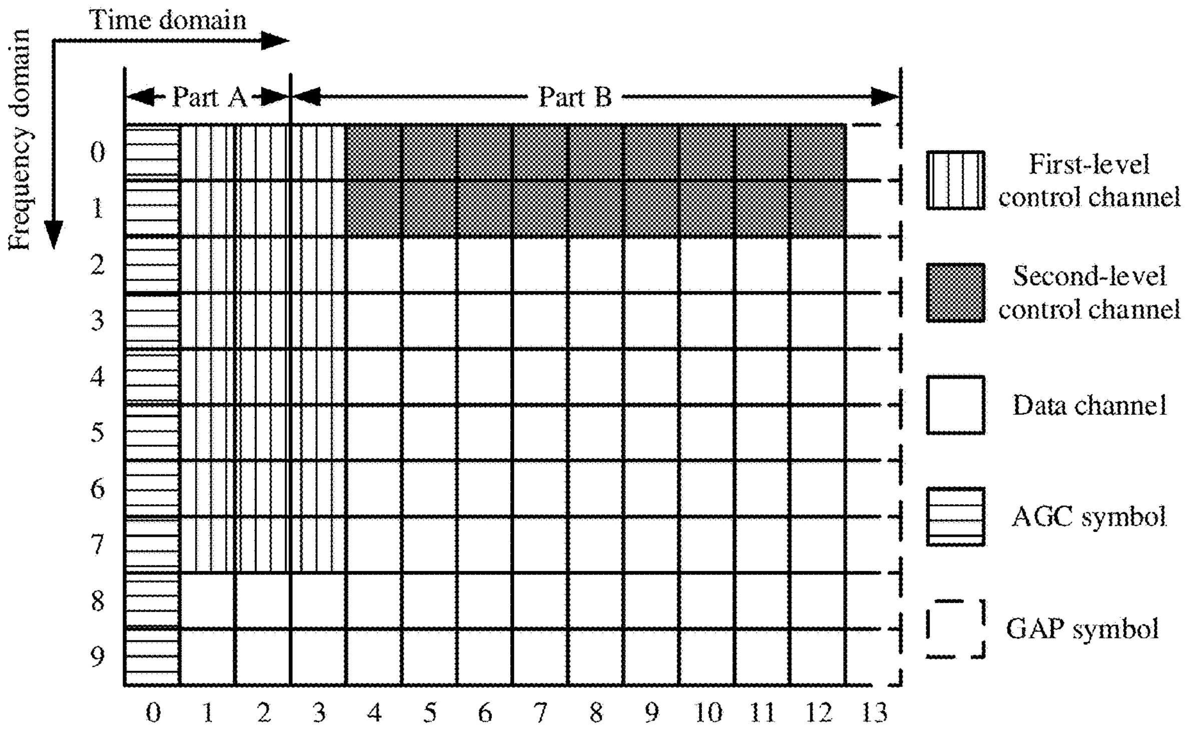
FIG. 6 is a second schematic diagram of resource distribution based on the frame structure shown in FIG. 4 according to an embodiment of this application.
Figure 7:
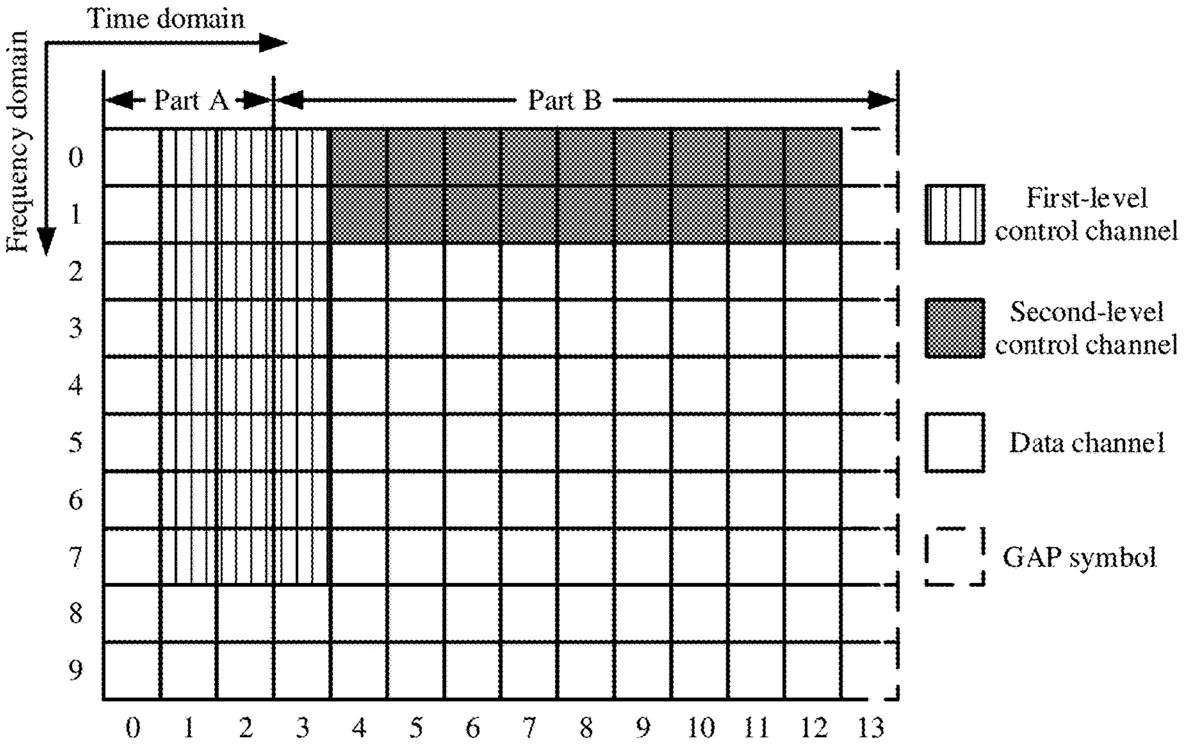
FIG. 7 is a third schematic diagram of resource distribution based on the frame structure shown in FIG. 4 according to an embodiment of this application.

For example, FIG. 5 to FIG. 7 are a first schematic diagram to a third schematic diagram of resource distribution based on the frame structure shown in FIG. 4 according to embodiments of this application. In FIG. 5 to FIG. 7, one time unit includes one slot in time domain, the slot includes 14 time domain symbols, and the 14 time domain symbols are numbered 0 to 13 from left to right. The time unit includes 10 RBs in frequency domain, and the 10 RBs are numbered 0 to 9 from top to bottom.

As shown in FIG. 5 to FIG. 7, a time domain position of the last symbol included in a resource occupied by the first-level control channel (namely, a time domain end position of the resource occupied by the first-level control channel) is used as a boundary, and the time unit may be divided into a part A and a part B in time domain.

In time domain, the resource occupied by the first-level control channel may include some or all of time domain resources in the part A. In frequency domain, the resource occupied by the first-level control channel may include some frequency domain resources in the part A. Usually, a size of the resource occupied by the first-level control channel is fixed, and may be represented as a rectangle including a plurality of resource blocks in the time unit in the figure.

It should be understood that a frequency domain start resource block of the resource occupied by the first-level control channel may be the same as or different from a frequency domain start resource block of the time unit. This is not limited in this application. That is, the resource occupied by the first-level control channel may include the uppermost resource block numbered 0 in the time unit, or may not include the uppermost resource block numbered 0 in the time unit. Alternatively, it may be understood that the resource occupied by the first-level control channel may be aligned or not aligned with a frequency domain start position of the time unit.

It should be further understood that the resource occupied by the first-level control channel may include a resource on the first symbol in the time unit, or may not include a resource on the first symbol in the time unit. For example, as shown in FIG. 5, if impact of automatic gain control (AGC) on the first-level control channel is not considered, the resource occupied by the first-level control channel may include the resource on the first symbol (a symbol 0) in the time unit, that is, first control information may be mapped to the resource on the first symbol in the time unit, or it may be understood that the first-level control channel may be mapped by starting from the first symbol in the time unit.

For another example, as shown in FIG. 6 and FIG. 7, if impact of AGC on the first-level control channel is considered, the resource occupied by the first-level control channel may not include the resource on the first symbol (a symbol 0) in the time unit, and first control information may avoid the first symbol in the time unit and may be mapped by starting from the second symbol (a symbol 1) in the time unit, or it may be understood that the first-level control channel avoids the first symbol in the time unit and is mapped by starting from the second symbol in the time unit.

It should be noted that, in a scenario in which the first symbol (the symbol 0) in the time unit is used for the AGC, a dedicated AGC symbol shown in FIG. 6 may be mapped to the first symbol, or data shown in FIG. 7 may be mapped to the first symbol. The dedicated AGC symbol or the data used for the AGC is mapped to all resource blocks on the first symbol. The dedicated AGC symbol may be used to map a sequence, for example, a pseudo-random sequence, that is generated according to a preset method and that is used for the AGC; or map another function symbol, for example, duplicate or copy another symbol in the slot. The data used for the AGC may be data (valid data) that needs to be demodulated and decoded by a receive end, or may be data (invalid data) that is used only for the AGC and that does not need to be demodulated and decoded by a receive end. This is not limited in the embodiments of this application.

It should be understood that the resource in the part A shown in FIG. 4 to FIG. 7 may also be referred to as a first resource set in the time unit, and the resource in the part B may also be referred to as a second resource set in the time unit in the embodiments of this application. Referring to FIG. 4 to FIG. 7, it may be learned that the second resource set is located after the first resource set in time domain and is adjacent to the first resource set, and a second-level control channel occupies all symbols in the second resource set in time domain. That is, the first resource set includes the resource occupied by the first-level control channel, and the second resource set includes a resource occupied by the second-level control channel.

Referring to FIG. 5 to FIG. 7, the first resource set may occupy an $n^{th}$ symbol to an $(n+k)^{th}$ symbol in the time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, if the first-level control channel carries an aggregation level of the second-level control channel, the method shown in FIG. 3 may further include: determining, by the first terminal device based on the aggregation level and a minimum resource scheduling granularity of the second-level control channel, a quantity of resources occupied by the second-level control channel, to further determine a quantity of resources occupied by the data channel.

The minimum resource scheduling granularity may be N resource blocks RBs in frequency domain, and may be all symbols in the second resource set in time domain, where N is a positive integer. The aggregation level is a ratio of the quantity of resources occupied by the second-level control channel to the minimum resource scheduling granularity, and may be a value of 1, 2, 4, 8, 32, or the like. For example, assuming that the minimum resource scheduling granularity is one RB in frequency domain and may be all the symbols in the second resource set in time domain, and the aggregation level is 1, the quantity of resources occupied by the second-level control channel is a quantity of resources defined for the minimum resource scheduling granularity, that is, resources corresponding to one row of RBs in the second resource set shown in any one of FIG. 5 to FIG. 7.

Optionally, the determining, based on the aggregation level and a minimum resource scheduling granularity of the second-level control channel, a quantity of resources occupied by the second-level control channel may include: determining, by the first terminal device, a product of the aggregation level and the minimum resource scheduling granularity of the second-level control channel as the quantity of resources occupied by the second-level control channel.

Further, if it is learned that the second-level control channel is mapped by starting from a preset frequency domain position, a frequency domain position of the resource occupied by the second-level control channel may be determined based on the quantity of resources occupied by the second-level control channel. That is, the method shown in FIG. 3 may further include: determining, by the first terminal device based on the quantity of resources occupied by the second-level control channel, the frequency domain position of the resource occupied by the second-level control channel in the second resource set. Specifically, the frequency domain position of the resource occupied by the second-level control channel may be determined in the second resource set from the preset frequency domain position. For example, the second-level control channel may occupy, by starting from a resource block with a smallest number, one or more resource blocks in the second resource set in ascending order of resource block numbers, to reduce resource overheads.

After the resource occupied by the second-level control channel is determined, the resource occupied by the data channel may be determined. The resource occupied by the data channel may include: a resource that is in the time unit and that is other than the resource occupied by the first-level control channel, the resource occupied by the second-level control channel, a resource occupied by a demodulation reference signal (DMRS), a resource on the first symbol to which valid data is not mapped, and a resource on a guard gap (GAP) symbol.

Figure 8:
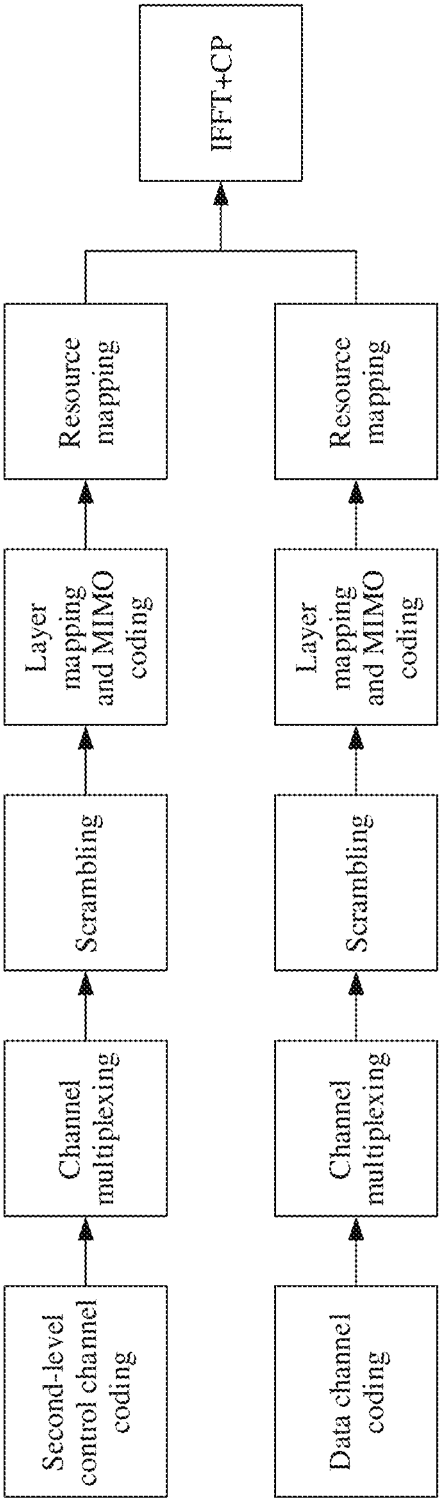
FIG. 8 is a schematic diagram of a modulation and coding procedure according to an embodiment of this application.

FIG. 8 is a schematic flowchart of independently performing modulation and coding on a second control channel and a data channel according to an embodiment of this application. First, channel coding, channel multiplexing, scrambling, layer mapping, multiple-input multiple-output (MIMO) coding, and resource mapping are separately performed on a first-level control channel and the data channel, and then an inverse fast fourier transform (IFFT) operation and a cyclic prefix (CP) operation are performed on the first-level control channel and the data channel on which the resource mapping is completed. The foregoing S301 of determining, by the first terminal device in a second resource set, a resource occupied by a second-level control channel and a resource occupied by a data channel occurs before the channel coding step shown in FIG. 8. For the channel coding, the channel multiplexing, the scrambling, the layer mapping, the MIMO coding, the IFFT operation, and the CP operation, refer to an existing implementation. Details are not described in this embodiment of this application.

The resource mapping shown in FIG. 8 means that the second-level control channel and the data channel are mapped to respective resources. For example, the second-level control channel may be mapped, first in frequency domain and then in time domain, to the resource occupied by the second-level control channel, and the data channel may be mapped, first in frequency domain and then in time domain, to the resource occupied by the data channel.

In other words, the MIMO coding, the layer mapping, and the resource mapping may be independently performed on each of the second-level control channel and the data channel. That is, after the channel coding and rate matching are independently performed on each of the second-level control channel and the data channel, the MIMO coding, the layer mapping, and the resource mapping may be independently performed on the resources respectively occupied by the second-level control channel and the data channel, so that when the plurality of channels are included, a modulation and coding procedure of the first terminal device can be simplified, thereby improving sending efficiency.

Optionally, the method shown in FIG. 3 may further include: mapping, first in frequency domain and then in time domain, the second-level control channel on the resource occupied by the second-level control channel; and mapping, first in frequency domain and then in time domain, the data channel on the resource occupied by the data channel.

In this embodiment of this application, the first terminal device may perform resource mapping on the second-level control channel first in frequency domain and then in time domain in ascending order. Specifically, the first-level control channel is mapped, by starting from the first symbol of the resource occupied by the second-level control channel, to all resource blocks on the symbol in ascending order of resource block numbers, until the first-level control channel is mapped to all the resource blocks on the symbol. Then, the first-level control channel is mapped to a next symbol. The second-level control channel is also mapped to all resource blocks on the next symbol in ascending order of resource block numbers, until the second-level control channel is mapped to all the resource blocks on the symbol. The rest is deduced by analogy until the second-level control channel is mapped to all symbols of the resource occupied by the second-level control channel.

Similarly, the first terminal device may also perform resource mapping on the data channel first in frequency domain and then in time domain in ascending order. Specifically, the data channel is mapped, by starting from the first symbol of the resource occupied by the data channel, to all resource blocks on the symbol in ascending order of resource block numbers, until the data channel is mapped to all the resource blocks on the symbol. Then, the data channel is mapped to a next symbol. The data channel is also mapped to all resource blocks on the next symbol in ascending order of resource block numbers, until the data channel is mapped to all the resource blocks on the symbol. The rest is deduced by analogy until the data channel is mapped to all symbols of the resource occupied by the data channel. Detailed descriptions are provided below with reference to FIG. 5 to FIG. 7.

As shown in FIG. 5, the resource occupied by the second-level control channel includes RBs (RBs 0 and RBs 1) whose RB numbers are 0 and 1 on the fourth symbol to the thirteenth symbol (a symbol 3 to a symbol 12) in the time unit. In this case, the first terminal device sequentially maps the second-level control channel to the RB 0 and the RB 1 on the symbol 3, the RB 0 and the RB 1 on the symbol 4, . . . , and the RB 0 and the RB 1 on the symbol 12. Similarly, the resource occupied by the data channel includes RBs 8 and RBs 9 on the first symbol to the third symbol (a symbol 0 to a symbol 2), and RBs 2 to RBs 9 on the fourth symbol to the thirteenth symbol (the symbol 3 to the symbol 12) in the time unit. In this case, the first terminal device sequentially maps the data channel to the RB 8 and the RB 9 on the symbol 0, the RB 8 and the RB 9 on the symbol 1, the RB 8 and the RB 9 on the symbol 2, the RB 2 to the RB 9 on the symbol 3, the RB 2 to the RB 9 on the symbol 4 . . . , and the RB 2 to the RB 9 on the symbol 12.

As shown in FIG. 6, the resource occupied by the second-level control channel includes RBs 0 and RBs 1 on the fifth symbol to the thirteenth symbol (a symbol 4 to a symbol 12) in the time unit. In this case, the first terminal device sequentially maps the second-level control channel to the RB 0 and the RB 1 on the symbol 4, the RB 0 and the RB 1 on the symbol 5, . . . , and the RB 0 and the RB 1 on the symbol 12. Similarly, the resource occupied by the data channel includes RBs 8 and RBs 9 on the second symbol to the fourth symbol (a symbol 1 to a symbol 3), and RBs 2 to RBs 9 on the fifth symbol to the thirteenth symbol (the symbol 4 to the symbol 12) in the time unit. In this case, the first terminal device sequentially maps the data channel to the RB 8 and the RB 9 on the symbol 1, the RB 8 and the RB 9 on the symbol 2, the RB 8 and the RB 9 on the symbol 3, the RB 2 to the RB 9 on the symbol 4, the RB 2 to the RB 9 on the symbol 5 . . . , and the RB 2 to the RB 9 on the symbol 12.

As shown in FIG. 7, the resource occupied by the second-level control channel includes RBs 0 and RBs 1 on the fifth symbol to the thirteenth symbol (a symbol 4 to a symbol 12) in the time unit. In this case, the first terminal device sequentially maps the second-level control channel to the RB 0 and the RB 1 on the symbol 4, the RB 0 and the RB 1 on the symbol 5, . . . , and the RB 0 and the RB 1 on the symbol 12. Similarly, the resource occupied by the data channel includes all RBs (an RB 0 to an RB 9) on the first symbol, RBs 8 and RBs 9 on the second symbol to the fourth symbol (a symbol 1 to a symbol 3), and RBs 2 to RBs 9 on the fifth symbol to the thirteenth symbol (the symbol 4 to the symbol 12) in the time unit. In this case, the first terminal device sequentially maps the data channel to the RB 0 to the RB 9 on the symbol 0, the RB 8 and the RB 9 on the symbol 1, the RB 8 and the RB 9 on the symbol 2, the RB 8 and the RB 9 on the symbol 3, the RB 2 to the RB 9 on the symbol 4, the RB 2 to the RB 9 on the symbol 5 . . . , and the RB 2 to the RB 9 on the symbol 12.

S302: The first terminal device sends the second-level control channel and the data channel to the second terminal device, where an average transmit power of the second-level control channel is higher than an average transmit power of the data channel.

For example, the first terminal device sends a PSSCH to the second terminal device. The PSSCH carries the second-level control channel and the data channel.

It should be noted that the first terminal device may further send, to the second terminal device, a PSCCH corresponding to the PSSCH. The PSCCH carries a first-level control channel.

In this embodiment of this application, when power enhancement is performed on the first-level control channel, power enhancement may further be performed on the second-level control channel, to improve reliability of the second-level control channel.

In addition, it is stipulated in an existing protocol that a transmit power on a same symbol is fixed. That is, when power enhancement is performed on the second-level control channel, a transmit power of the data channel that is located on a same symbol as the second-level control channel needs to be reduced at the same time, that is, the average transmit power of the second-level control channel is higher than the average transmit power of the data channel. The average transmit power may be one of the following: an average transmit power on each resource block RB, and an average transmit power on each resource element (resource element, RE).

Further, to enable the second-level control channel to obtain relatively large power enhancement and reduce occupation of the transmit power of the data channel, the second-level control channel may be mapped to all time domain symbols in the second resource set in a decentralized manner. As shown in FIG. 5 to FIG. 7, the resource occupied by the second-level control channel includes all the symbols in the second resource set in time domain.

It should be noted that, because resource configuration information (for example, an aggregation level) and a demodulation parameter (for example, an MCS) of the second-level control channel are carried on the first-level control channel, the method shown in FIG. 3 may further include: sending, by the first terminal device, the first-level control channel to the second terminal device, where a resource occupied by the first-level control channel is located in a first resource set, and is usually a resource preconfigured in a network or predefined in a protocol.

S303: The second terminal device receives the second-level control channel and the data channel from the first terminal device, where the average transmit power of the second-level control channel is higher than the average transmit power of the data channel.

It should be noted that, because the resource configuration information (for example, the aggregation level) and the demodulation parameter (for example, the MCS) of the second-level control channel are carried on the first-level control channel, the method shown in FIG. 3 may further include: receiving and parsing, by the second terminal device, the first-level control channel from the first terminal device, to obtain content carried on the first-level control channel, for example, the resource configuration information and the demodulation parameter of the second-level control channel.

S304: The second terminal device determines the resource occupied by the second-level control channel in the second resource set.

The second resource set is located after the first resource set in time domain and is adjacent to the first resource set, and the second-level control channel occupies all the symbols in the second resource set in time domain.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, the first resource set includes the resource occupied by the first-level control channel, and the first-level control channel carries the aggregation level of the second-level control channel. Correspondingly, the method shown in FIG. 3 may further include: determining, by the second terminal device based on the aggregation level and a minimum resource scheduling granularity of the second-level control channel, a quantity of resources occupied by the second-level control channel.

Optionally, the determining, by the second terminal device based on the aggregation level and a minimum resource scheduling granularity of the second-level control channel, a quantity of resources occupied by the second-level control channel may include: determining, by the second terminal device, a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the method shown in FIG. 3 may further include: determining, by the second terminal device based on the quantity of resources occupied by the second-level control channel, a frequency domain position of the resource occupied by the second-level control channel in the second resource set.

Specifically, the resource occupied by the second-level control channel may be determined in the second resource set according to a preset rule. For example, the second-level control channel may occupy, by starting from a resource block with a smallest number, one or more resource blocks in the second resource set in ascending order of resource block numbers. In this way, information indicating the frequency domain position of the resource occupied by the second-level control channel may not be transmitted, to reduce the resource overheads.

It should be noted that for specific implementations in which the second terminal device determines the quantity of resources occupied by the second-level control channel, a time domain position of the resource occupied by the second-level control channel, and the frequency domain position of the resource occupied by the second-level control channel, refer to FIG. 4 to FIG. 7 in S301 and related text descriptions. Details are not described herein again.

Optionally, the method shown in FIG. 3 may further include: demapping, by the second terminal device first in frequency domain and then in time domain, the second-level control channel on the resource occupied by the second-level control channel.

In a possible design method, after FFT is performed and a CP is removed, the second-level control channel may be parsed based on a demodulation and decoding (demodulation & decoding) procedure in a reverse order of the modulation and coding procedure shown in FIG. 8, to obtain content carried on the second-level control channel. The demodulation and decoding procedure for the second-level control channel may sequentially include the following steps: resource demapping, MIMO decoding, layer demapping, descrambling, channel demultiplexing, rate de-matching, and channel decoding. For the steps of the demodulation and decoding procedure, refer to related content of the modulation and coding procedure shown in FIG. 8 in S301. Details are not described herein again.

S305: The second terminal device parses the second-level control channel based on the resource occupied by the second-level control channel, to obtain the resource occupied by the data channel in the second resource set.

It should be noted that for specific implementations in which the second terminal device determines a quantity of resources occupied by the data channel, a time domain position of the resource occupied by the data channel, and a frequency domain position of the resource occupied by the data channel, refer to FIG. 4 to FIG. 7 in S301 and related text descriptions. Details are not described herein again.

In a possible design method, after the FFT is performed and the CP is removed, the data channel may be parsed based on the demodulation and decoding (demodulation & decoding) procedure in the reverse order of the modulation and coding procedure shown in FIG. 8, to obtain data carried on the data channel. The demodulation and decoding procedure for each channel may sequentially include the following steps: resource demapping, MIMO decoding, layer demapping, descrambling, channel demultiplexing, rate de-matching, and channel decoding.

In addition, because the second-level control channel further carries a demodulation parameter of the data channel, after performing S305, the second terminal device may further obtain the demodulation parameter of the data channel.

It should be noted that, because the demodulation parameter (for example, the MCS) and the resource configuration information (for example, the aggregation level) of the second-level control channel are carried on the first-level control channel, the method shown in FIG. 3 may further include: receiving and parsing the first-level control channel. The resource occupied by the first-level control channel is located in the first resource set, and is usually a resource preconfigured in a network or predefined in a protocol.

S306: The second terminal device parses the data channel based on the resource occupied by the data channel, to obtain the data carried on the data channel.

It should be noted that, because the second-level control channel carries the demodulation parameter and the wireless resource configuration information of the data channel, the second terminal device needs to first parse the second-level control channel, and then can parse the data channel.

Optionally, the method provided in the second aspect may further include: demapping, first in frequency domain and then in time domain, the data channel on the resource occupied by the data channel.

According to the method for sending two levels of control channels shown in FIG. 3, the first terminal device may determine, in the second resource set that does not overlap the first resource set in time domain, the resource occupied by the second-level control channel and the resource occupied by the data channel, where the second-level control channel occupies all the time domain symbols in the second resource set, and the average transmit power of the second-level control channel is higher than the average transmit power of the data channel. That is, in a scenario in which power enhancement is performed on the first-level control channel, the second-level control channel can avoid a time domain symbol occupied by the first-level control channel, so that power enhancement is further performed on the second-level control channel, thereby improving a decoding success rate of the second-level control channel, and improving the reliability of the second-level control channel.

In addition, the second-level control channel occupies all the time domain symbols in the second resource set. Therefore, in a scenario in which power enhancement is performed on the second-level control channel, adverse impact of the second-level control channel on the data channel can be reduced, thereby ensuring reliability of the data channel.

Figure 9:
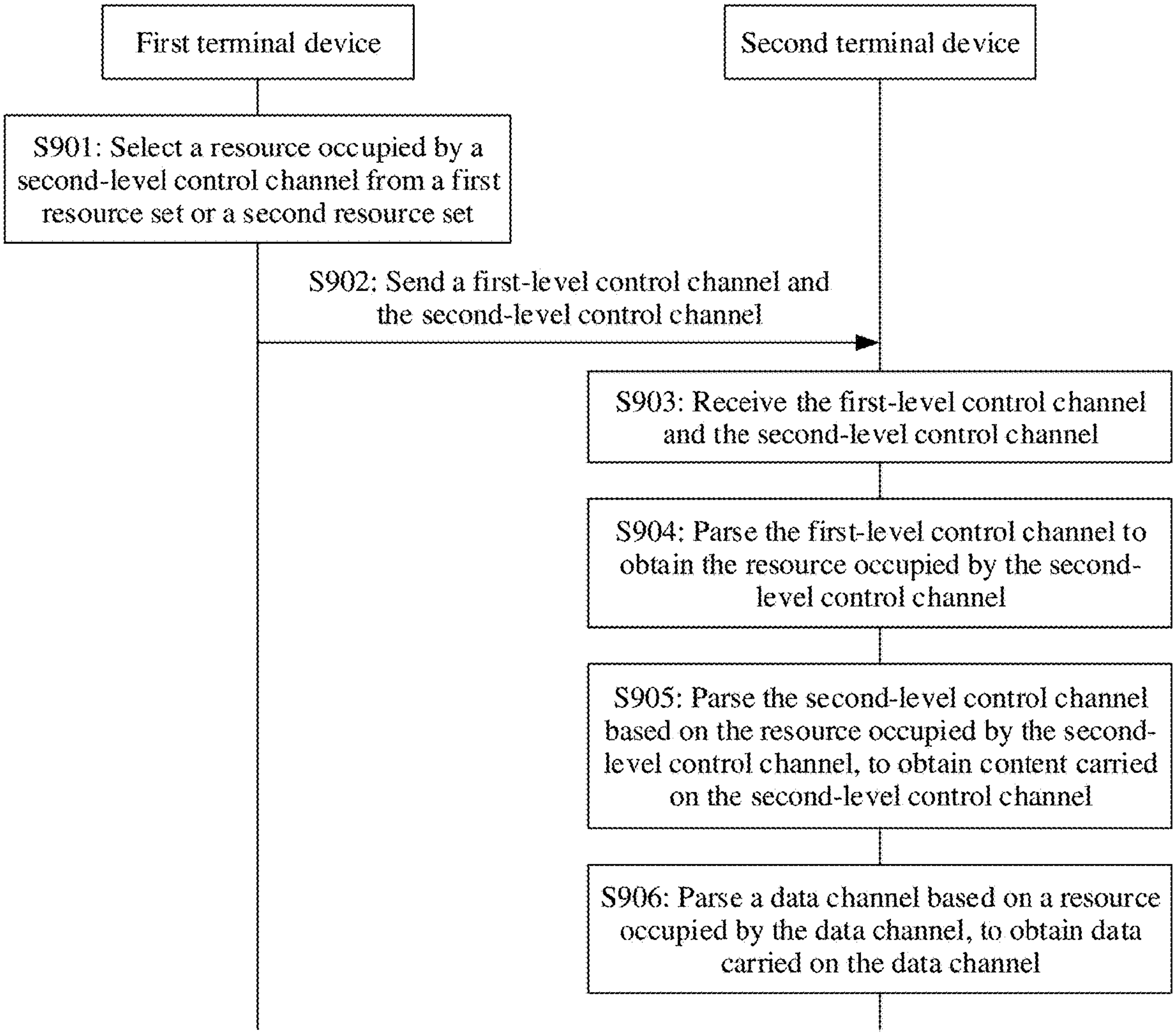
FIG. 9 is a second schematic flowchart of a method for sending two levels of control channels according to an embodiment of this application.

FIG. 9 is a second schematic flowchart of a method for sending two levels of control channels according to an embodiment of this application. The method for sending two levels of control channels is applicable to the communications system shown in FIG. 2, to implement communication between the first terminal device and the second terminal device. The following describes in detail the method for sending two levels of control channels provided in the embodiments of this application by using an example in which the first terminal device is a sending terminal and the second terminal device is a receiving terminal.

As shown in FIG. 9, the method includes S901 to S906.

S901: The first terminal device selects a resource occupied by a second-level control channel from a first resource set or a second resource set.

The following describes, with reference to the frame structure of the time unit shown in FIG. 4, the first resource set or the second resource set to which the method shown in FIG. 9 is applicable.

Figure 10:
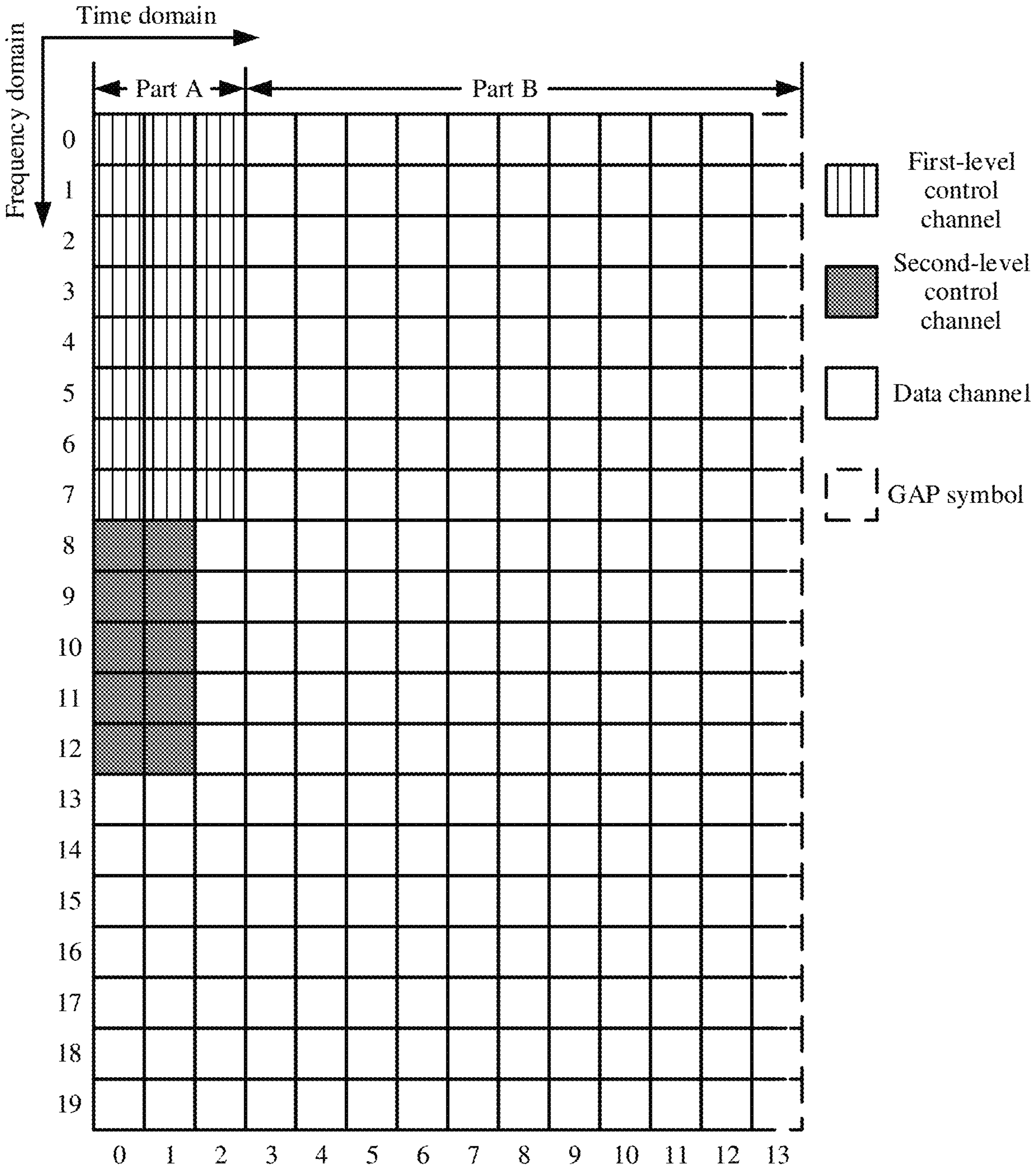
FIG. 10 is a fourth schematic diagram of resource distribution based on the frame structure shown in FIG. 4 according to an embodiment of this application.
Figure 11:
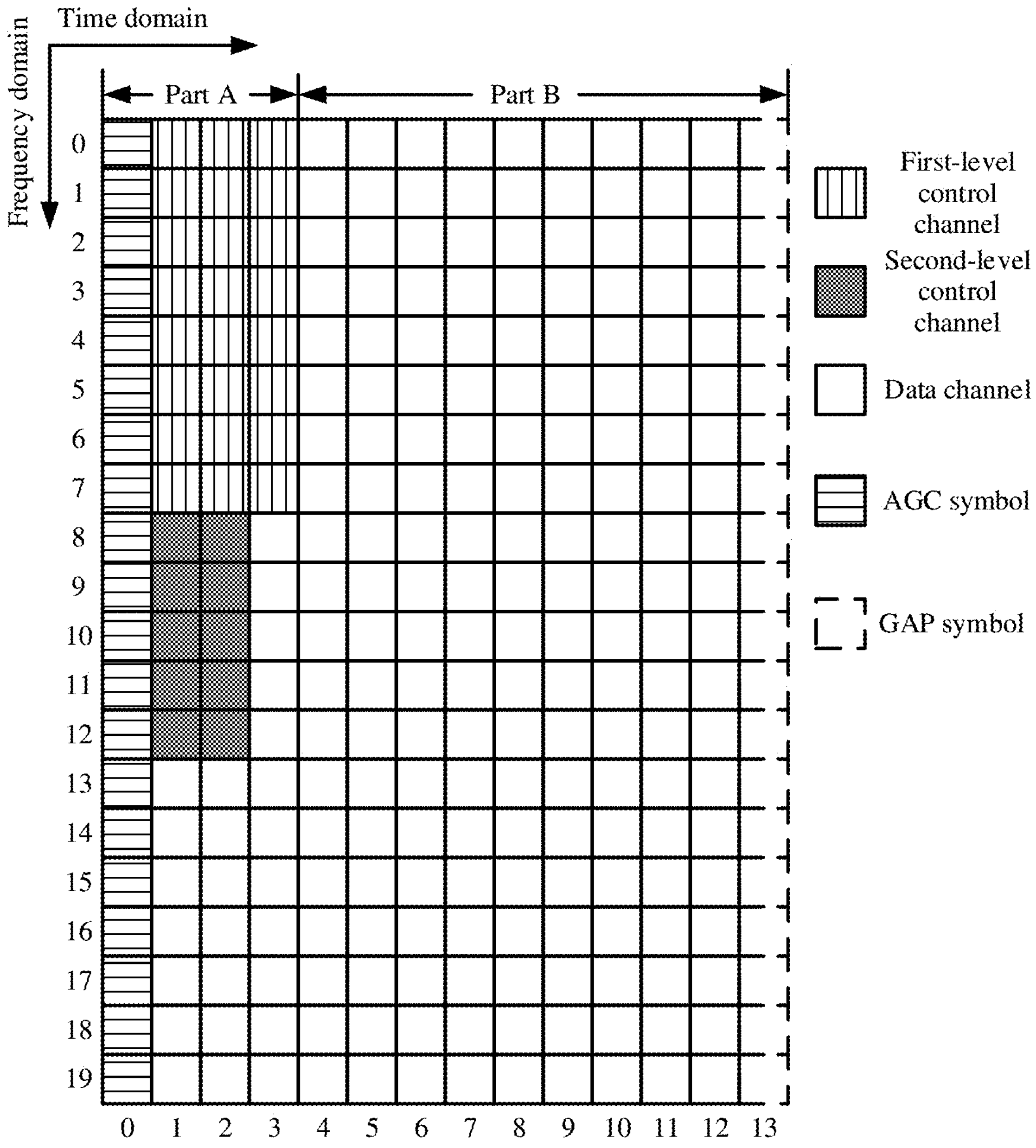
FIG. 11 is a fifth schematic diagram of resource distribution based on the frame structure shown in FIG. 4 according to an embodiment of this application.
Figure 12:
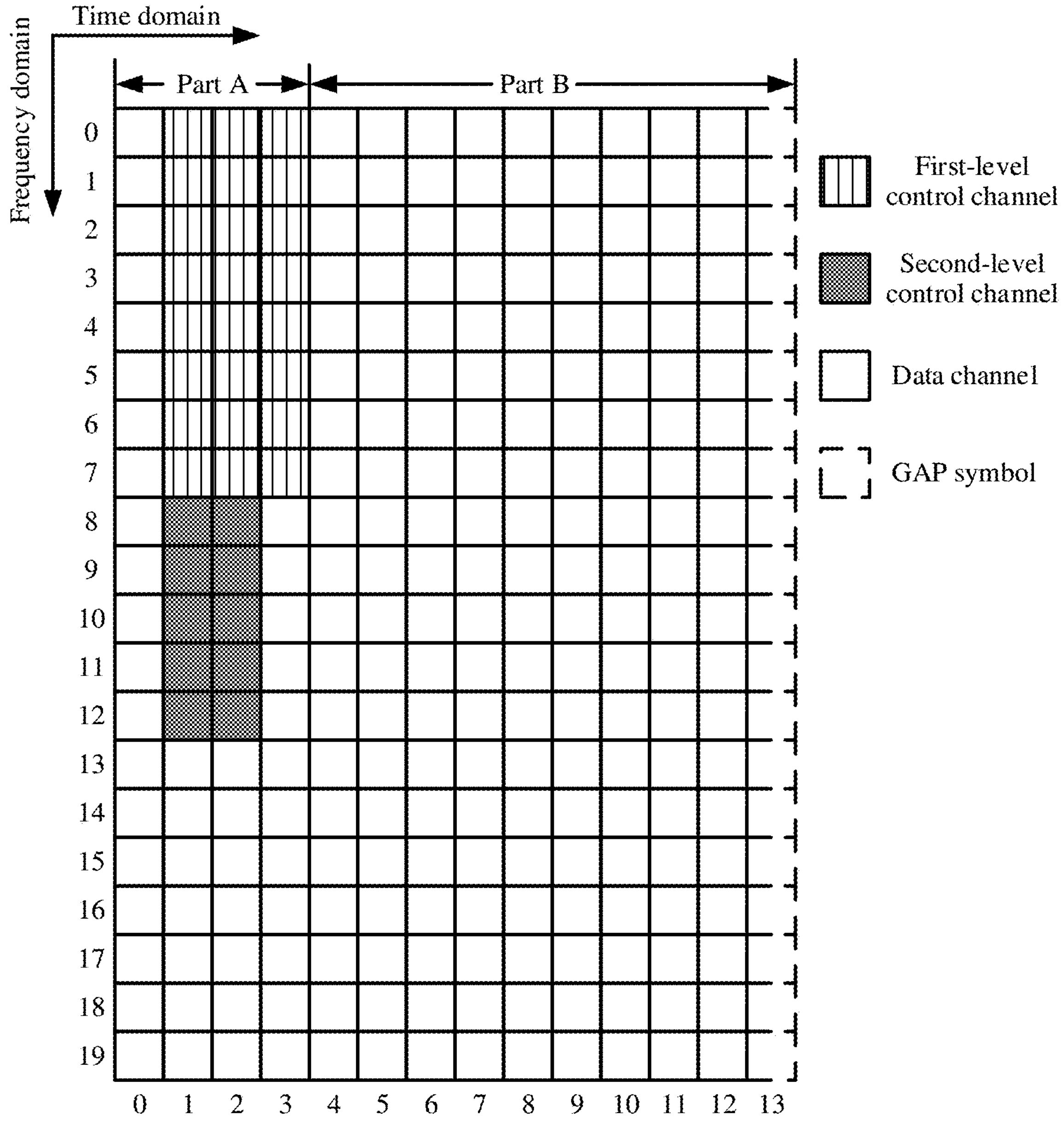
FIG. 12 is a sixth schematic diagram of resource distribution based on the frame structure shown in FIG. 4 according to an embodiment of this application.

For example, FIG. 10 to FIG. 12 are a fourth schematic diagram to a sixth schematic diagram of resource distribution based on the frame structure shown in FIG. 4 according to embodiments of this application. In FIG. 10 to FIG. 12, one time unit includes one slot in time domain, the slot includes 14 time domain symbols, and the 14 time domain symbols are numbered 0 to 13 from left to right. The time unit includes 20 RBs in frequency domain, and the 20 RBs are numbered 0 to 19 from top to bottom.

As shown in FIG. 10 to FIG. 12, a time domain position of the last symbol included in a resource occupied by a first-level control channel (namely, a time domain end position of the resource occupied by the first-level control channel) is used as a boundary, and the time unit may be divided into a part A and a part B in time domain.

In time domain, the resource occupied by the first-level control channel may include some or all of time domain resources in the part A. In frequency domain, the resource occupied by the first-level control channel may include some frequency domain resources in the part A. Usually, a size of the resource occupied by the first-level control channel is fixed, and may be represented as a rectangle including a plurality of resource blocks in the time unit in the figure.

It should be understood that a frequency domain start resource block of the resource occupied by the first-level control channel may be the same as or different from a frequency domain start resource block of the time unit. This is not limited in this application. That is, the resource occupied by the first-level control channel may include the uppermost resource block numbered 0 in the time unit, or may not include the uppermost resource block numbered 0 in the time unit. Alternatively, it may be understood that the resource occupied by the first-level control channel may be aligned or not aligned with a frequency domain start position of the time unit.

It should be further understood that the resource occupied by the first-level control channel may include a resource on the first symbol in the time unit, or may not include a resource on the first symbol in the time unit. For example, as shown in FIG. 10, if impact of AGC on the first-level control channel is not considered, the resource occupied by the first-level control channel may include the resource on the first symbol (a symbol 0) in the time unit, that is, first control information may be mapped to the resource on the first symbol in the time unit, or it may be understood that the first-level control channel may be mapped by starting from the first symbol in the time unit.

For another example, as shown in FIG. 11 and FIG. 12, if impact of AGC on the first-level control channel is considered, the resource occupied by the first-level control channel may not include the resource on the first symbol (a symbol 0) in the time unit, and first control information may avoid the first symbol in the time unit and may be mapped by starting from the second symbol (a symbol 1) in the time unit, or it may be understood that the first-level control channel avoids the first symbol in the time unit, and is mapped by starting from the second symbol in the time unit.

It should be noted that, in a scenario in which the first symbol (the symbol 0) in the time unit is used for the AGC, a dedicated AGC symbol shown in FIG. 11 may be mapped to the first symbol, or data shown in FIG. 12 may be mapped to the first symbol. The dedicated AGC symbol or the data used for the AGC is mapped to all resource blocks on the first symbol. The dedicated AGC symbol may be used to map a sequence, for example, a pseudo-random sequence, that is generated according to a preset method and that is used for the AGC; or map another function symbol, for example, duplicate or copy another symbol in the slot. The data used for the AGC may be data (valid data) that needs to be demodulated and decoded by a receive end, or may be data (invalid data) that is used only for the AGC and that does not need to be demodulated and decoded by a receive end. This is not limited in the embodiments of this application.

It should be understood that the resource in the part A shown in FIG. 10 to FIG. 12 may also be referred to as a first resource set in the time unit, and the resource in the part B may also be referred to as a second resource set in the time unit in the embodiments of this application. Referring to FIG. 10 to FIG. 12, it may be learned that the second resource set is located after the first resource set in time domain and is adjacent to the first resource set, and the second-level control channel occupies all symbols in the second resource set in time domain. That is, the first resource set includes the resource occupied by the first-level control channel, and the second resource set includes a resource occupied by the second-level control channel.

Referring to FIG. 10 to FIG. 12, the first resource set may occupy an $n^{th}$ symbol to an $(n+k)^{th}$ symbol in the time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In this embodiment of this application, to ensure both reliability and a decoding delay of the second-level control channel, the resource occupied by the second-level control channel may be selected from the first resource set or the second resource set in different scenarios based on one or more of a total quantity of resources of the first resource set, a quantity of resources occupied by the first-level control channel, a quantity of resources occupied by the second-level control channel, and whether power enhancement is performed on the first-level control channel. For a method for calculating the quantity of resources occupied by the second-level control channel, refer to related content in S901. Details are not described herein again.

In a possible design method, when the resource occupied by the second-level control channel is selected from the first resource set, the resource occupied by the second-level control channel is adjacent to the resource occupied by the first-level control channel in frequency domain. This solution is applicable to a scenario in which power enhancement is not performed on the first-level control channel, and both the first-level control channel and the second-level control channel may be mapped to the first resource set. In this scenario, the second-level control channel may not avoid the first-level control channel. Therefore, the second-level control channel and the first-level control channel may simultaneously occupy some resources of the first resource set in a frequency division multiplexing manner, to reduce the decoding delay of the second-level control channel.

Optionally, the selecting a resource occupied by a second-level control channel from a first resource set or a second resource set may include: when a difference between the total quantity of resources of the first resource set and the quantity of resources occupied by the first-level control channel is greater than or equal to the quantity of resources occupied by the second-level control channel, selecting the resource occupied by the second-level control channel from the first resource set. In other words, provided that a remaining resource that is in the first resource set and that is other than the resource occupied by the first-level control channel, a resource occupied by a demodulation reference signal DMRS, and a resource on the first symbol to which valid data is not mapped is sufficient to carry the second-level control channel, the second-level control channel may be mapped to the first resource set.

Further, a time domain start symbol of the resource occupied by the second-level control channel and a time domain start symbol of the resource occupied by the first-level control channel may be a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

As shown in FIG. 10, the resource occupied by the second-level control channel may include RBs 8 to RBs 12 on the first symbol and the second symbol (a symbol 0 and a symbol 1) in the time unit. As shown in FIG. 11 and FIG. 12, the resource occupied by the second-level control channel may include RBs 8 to RBs 12 on the second symbol and the third symbol (a symbol 1 and a symbol 2) in the time unit.

In another possible design method, when the resource occupied by the second-level control channel is selected from the second resource set, the resource occupied by the second-level control channel is adjacent to the resource occupied by the first-level control channel in time domain. This solution is applicable to a scenario in which power enhancement is performed on the first-level control channel. The second-level control channel needs to avoid the first-level control channel, that is, the second-level control channel needs to occupy the resource in the second resource set, to ensure the reliability of the second-level control channel. In this scenario, the second-level control channel may occupy a resource at the foremost time domain position in the second resource set, for example, occupy a resource on one or more consecutive time domain symbols at the foremost position in the second resource set, to reduce the decoding delay of the second-level control channel.

Optionally, the selecting a resource occupied by a second-level control channel from a first resource set or a second resource set may include: when a difference between the total quantity of resources of the first resource set and the quantity of resources occupied by the first-level control channel is less than the quantity of resources occupied by the second-level control channel, selecting the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that the reliability of the second-level control channel is ensured.

Optionally, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

Figure 13:
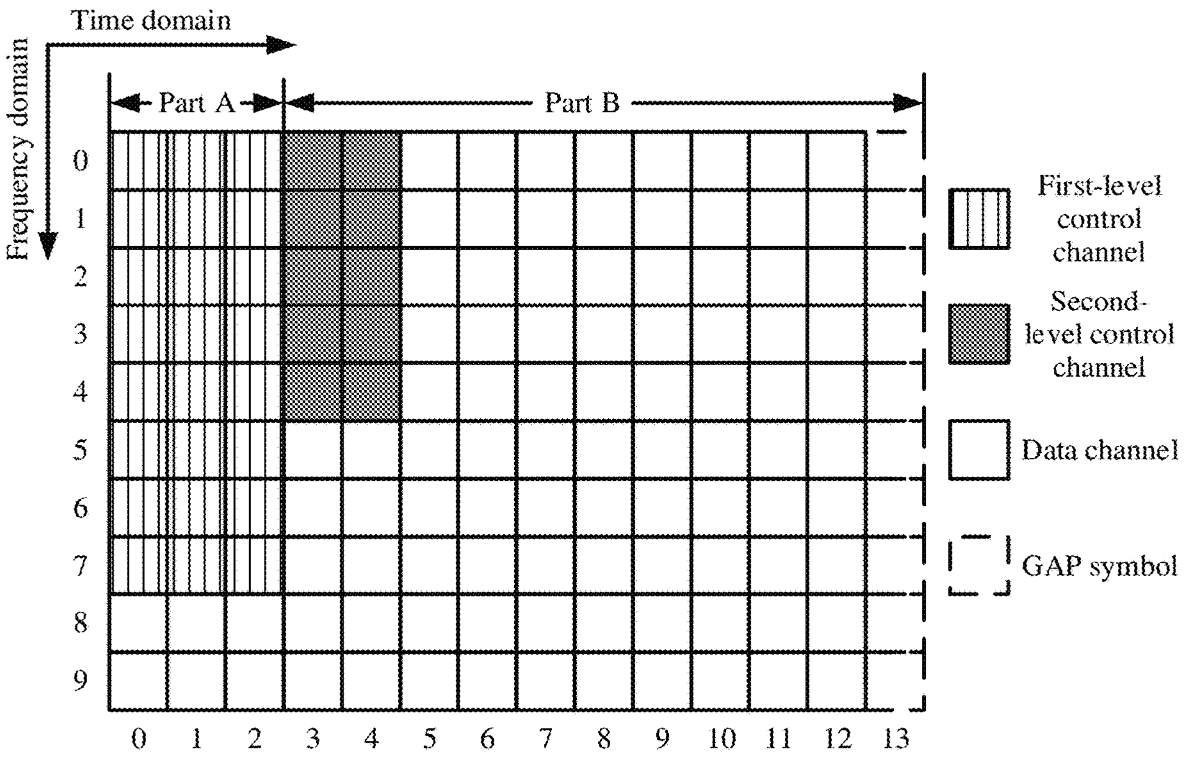
FIG. 13 is a seventh schematic diagram of resource distribution based on the frame structure shown in FIG. 4 according to an embodiment of this application.
Figure 14:
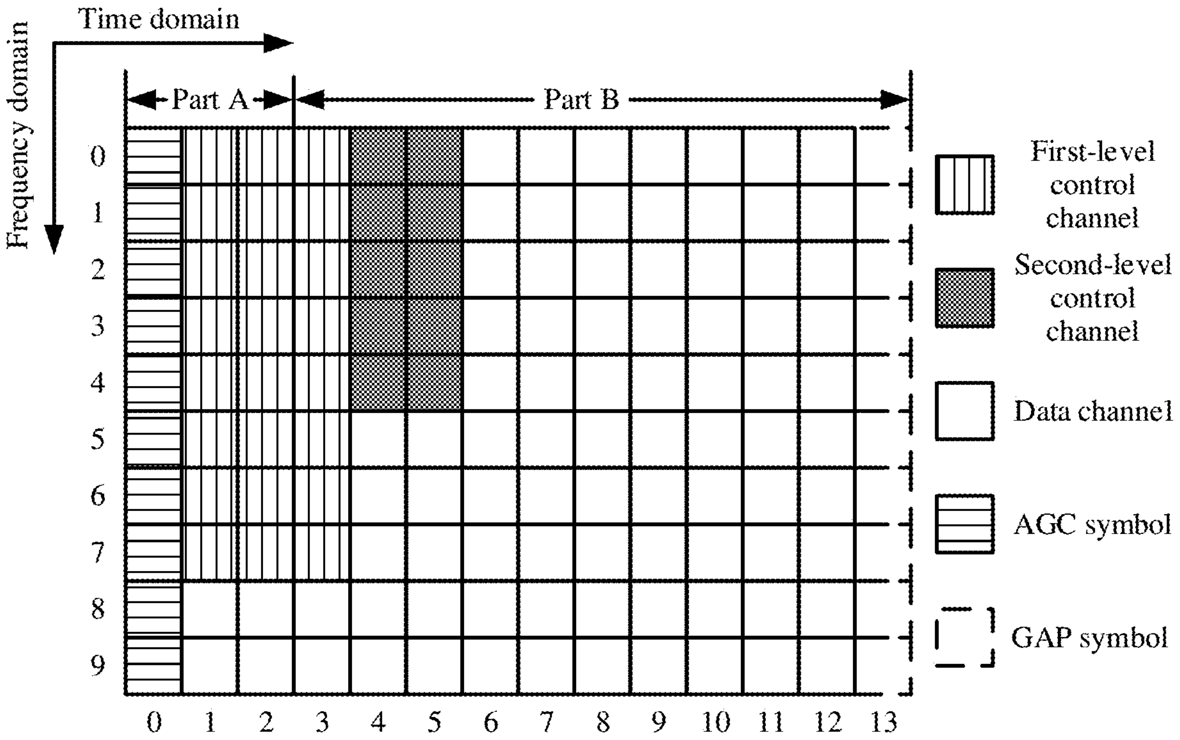
FIG. 14 is an eighth schematic diagram of resource distribution based on the frame structure shown in FIG. 4 according to an embodiment of this application.
Figure 15:
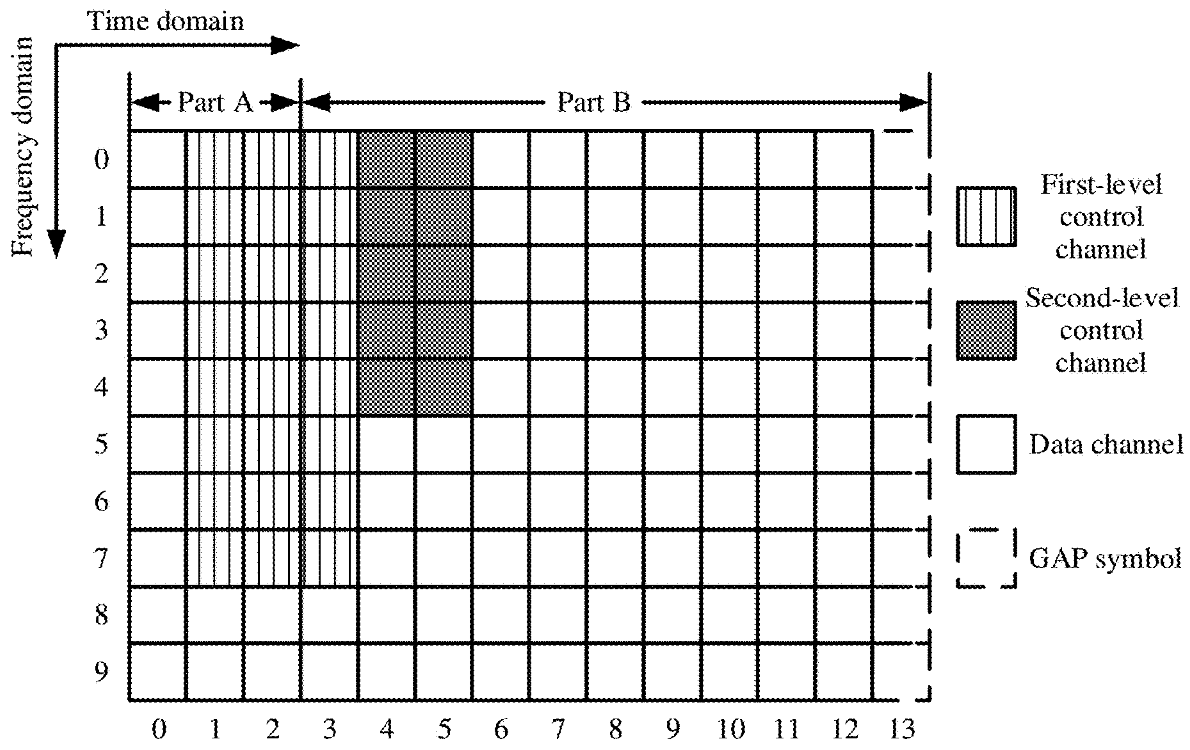
FIG. 15 is a ninth schematic diagram of resource distribution based on the frame structure shown in FIG. 4 according to an embodiment of this application.

For example, FIG. 13 to FIG. 15 are a fourth schematic diagram to a sixth schematic diagram of resource distribution based on the frame structure shown in FIG. 4 according to embodiments of this application. Different from FIG. 10 to FIG. 12, in FIG. 13 to FIG. 15, one time unit includes 10 RBs, and numbers of the RBs are sequentially an RB 0 to an RB 9 from top to bottom.

As shown in FIG. 13, the resource occupied by the second-level control channel includes RBs 0 to RBs 4 on the fourth symbol and the fifth symbol (a symbol 3 and a symbol 4) in the time unit. As shown in FIG. 14 and FIG. 15, the resource occupied by the second-level control channel may include RBs 0 to RBs 4 on the fifth symbol and the sixth symbol (a symbol 4 and a symbol 5) in the time unit.

After the resource occupied by the second-level control channel is determined, a resource occupied by a data channel may be determined. The resource occupied by the data channel may include: a resource that is in the time unit and that is other than the resource occupied by the first-level control channel, the resource occupied by the second-level control channel, a resource occupied by a demodulation reference signal DMRS, a resource on the first symbol to which valid data is not mapped, and a resource on a GAP symbol.

Determining of the resource occupied by the second-level control channel and the resource occupied by the data channel may occur before the channel coding step shown in FIG. 8. Resource mapping means that the second-level control channel and the data channel are mapped to respective resources. For example, the second-level control channel may be mapped, first in frequency domain and then in time domain, to the resource occupied by the second-level control channel, and the data channel may be mapped, first in frequency domain and then in time domain, to the resource occupied by the data channel.

In this embodiment of this application, multiple-input multiple-output MIMO coding, layer mapping, and resource mapping may be independently performed on each of the first-level control channel, the second-level control channel, and the data channel. That is, after channel coding and rate matching are independently performed on each of the first-level control channel, the second-level control channel, and the data channel, the MIMO coding, the layer mapping, and the resource mapping may be independently performed on the resources respectively occupied by the first-level control channel, the second-level control channel, and the data channel, so that when the plurality of channels are included, a modulation and coding procedure of the first terminal device can be simplified, thereby improving efficiency.

Optionally, the method shown in FIG. 9 may further include: mapping, by the first terminal device first in frequency domain and then in time domain, the second-level control channel on the resource occupied by the second-level control channel; and mapping, first in frequency domain and then in time domain, the data channel on the resource occupied by the data channel. Detailed descriptions are provided below with reference to FIG. 10 to FIG. 15.

As shown in FIG. 10, the resource occupied by the second-level control channel includes the RBs 8 to the RBs 12 on the first symbol and the second symbol (the symbol 0 and the symbol 1) in the time unit. In this case, the first terminal device sequentially maps the second-level control channel to the RB 8 to the RB 12 on the symbol 0, and the RB 8 to the RB 12 on the symbol 1. Similarly, the resource occupied by the data channel includes RBs 13 to RBs 19 on the first symbol and the second symbol (the symbol 0 and the symbol 1), an RB 8 to an RB 19 on the third symbol (a symbol 2), and RBs 0 to RBs 19 on the fourth symbol to the thirteenth symbol (a symbol 3 to a symbol 12) in the time unit. In this case, the first terminal device sequentially maps the data channel to the RB 13 to the RB 19 on the symbol 0, the RB 13 to the RB 19 on the symbol 1, the RB 8 to the RB 19 on the symbol 2, the RB 0 to the RB 19 on the symbol 3, the RB 0 to the RB 19 on the symbol 4 . . . , and the RB 0 to the RB 19 on the symbol 12.

As shown in FIG. 11, the resource occupied by the second-level control channel includes the RBs 8 to the RBs 12 on the second symbol and the third symbol (the symbol 1 and the symbol 2) in the time unit. In this case, the first terminal device sequentially maps the second-level control channel to the RB 8 to the RB 12 on the symbol 1, and the RB 8 to the RB 12 on the symbol 2. Similarly, the resource occupied by the data channel includes RBs 13 to RBs 19 on the second symbol and the third symbol (the symbol 1 and the symbol 2), an RB 8 to an RB 19 on the fourth symbol (a symbol 3), and RBs 0 to RBs 19 on the fifth symbol to the thirteenth symbol (a symbol 4 to a symbol 12) in the time unit. In this case, the first terminal device sequentially maps the data channel to the RB 13 to the RB 19 on the symbol 1, the RB 13 to the RB 19 on the symbol 2, the RB 8 to the RB 19 on the symbol 3, the RB 0 to the RB 19 on the symbol 4, the RB 0 to the RB 19 on the symbol 5 . . . , and the RB 0 to the RB 19 on the symbol 12.

As shown in FIG. 12, the resource occupied by the second-level control channel includes the RBs 8 to the RBs 12 on the second symbol and the third symbol (the symbol 1 and the symbol 2) in the time unit. In this case, the first terminal device sequentially maps the second-level control channel to the RB 8 to the RB 12 on the symbol 1, and the RB 8 to the RB 12 on the symbol 2. Similarly, the resource occupied by the data channel includes an RB 0 to an RB 19 on the first symbol (a symbol 0), RBs 13 to RBs 19 on the second symbol and the third symbol (the symbol 1 and the symbol 2), an RB 8 to an RB 19 on the fourth symbol (a symbol 3), and RBs 0 to RBs 19 on the fifth symbol to the thirteenth symbol (a symbol 4 to a symbol 12) in the time unit. In this case, the first terminal device sequentially maps the data channel to the RB 0 to the RB 19 on the symbol 0, the RB 13 to the RB 19 on the symbol 1, the RB 13 to the RB 19 on the symbol 2, the RB 8 to the RB 19 on the symbol 3, the RB 0 to the RB 19 on the symbol 4, the RB 0 to the RB 19 on the symbol 5 . . . , and the RB 0 to the RB 19 on the symbol 12.

As shown in FIG. 13, the resource occupied by the second-level control channel includes the RBs 0 to the RBs 4 on the fourth symbol and the fifth symbol (the symbol 3 and the symbol 4) in the time unit. In this case, the first terminal device sequentially maps the second-level control channel to the RB 0 to the RB 4 on the symbol 3, and the RB 0 to the RB 4 on the symbol 4. Similarly, the resource occupied by the data channel includes RBs 8 and RBs 9 on the first symbol to the third symbol (a symbol 0 to a symbol 2), RBs 5 to RBs 9 on the fourth symbol and the fifth symbol (the symbol 3 and the symbol 4), and RBs 0 to RBs 9 on the sixth symbol to the thirteenth symbol (a symbol 5 to a symbol 12) in the time unit. In this case, the first terminal device sequentially maps the data channel to the RB 8 and the RB 9 on the symbol 0, the RB 8 and the RB 9 on the symbol 1, the RB 8 to the RB 19 on the symbol 2, the RB 5 to the RB 9 on the symbol 3, the RB 5 to the RB 9 on the symbol 4, the RB 0 to the RB 9 on the symbol 5 . . . , and the RB 0 to the RB 9 on the symbol 12.

As shown in FIG. 14, the resource occupied by the second-level control channel includes the RBs 0 to the RBs 4 on the fifth symbol and the sixth symbol (the symbol 4 and the symbol 5) in the time unit. In this case, the first terminal device sequentially maps the second-level control channel to the RB 0 to the RB 4 on the symbol 4, and the RB 0 to the RB 4 on the symbol 5. Similarly, the resource occupied by the data channel includes RBs 8 and RBs 9 on the second symbol to the fourth symbol (a symbol 1 to a symbol 3), RBs 5 to RBs 9 on the fifth symbol and the sixth symbol (the symbol 4 and the symbol 5), and RBs 0 to RBs 9 on the seventh symbol to the thirteenth symbol (a symbol 6 to a symbol 12) in the time unit. In this case, the first terminal device sequentially maps the data channel to the RB 8 and the RB 9 on the symbol 1, the RB 8 and the RB 9 on the symbol 2, the RB 8 and the RB 9 on the symbol 3, the RB 5 to the RB 9 on the symbol 4, the RB 5 to the RB 9 on the symbol 5, the RB 0 to the RB 9 on the symbol 6 . . . , and the RB 0 to the RB 9 on the symbol 12.

As shown in FIG. 15, the resource occupied by the second-level control channel includes the RBs 0 to the RBs 4 on the fifth symbol and the sixth symbol (the symbol 4 and the symbol 5) in the time unit. In this case, the first terminal device sequentially maps the second-level control channel to the RB 0 to the RB 4 on the symbol 4, and the RB 0 to the RB 4 on the symbol 5. Similarly, the resource occupied by the data channel includes an RB 0 to an RB 9 on the first symbol (a symbol 0), RBs 8 and RBs 9 on the second symbol to the fourth symbol (a symbol 1 to a symbol 3), RBs 5 to RBs 9 on the fifth symbol and the sixth symbol (the symbol 4 and the symbol 5), and RBs 0 to RBs 9 on the seventh symbol to the thirteenth symbol (a symbol 6 to a symbol 12) in the time unit. In this case, the first terminal device sequentially maps the data channel to the RB 0 to the RB 9 on the symbol 0, the RB 8 and the RB 9 on the symbol 1, the RB 8 and the RB 9 on the symbol 2, the RB 8 and the RB 9 on the symbol 3, the RB 5 to the RB 9 on the symbol 4, the RB 5 to the RB 9 on the symbol 5, the RB 0 to the RB 9 on the symbol 6 . . . , and the RB 0 to the RB 9 on the symbol 12.

S902: The first terminal device sends a first-level control channel and the second-level control channel to the second terminal device.

For example, the first terminal device may send a PSCCH and a PSSCH to the second terminal device. The PSCCH carries the first-level control channel, and the PSSCH carries the second-level control channel and a data channel.

S903: The second terminal device receives the first-level control channel and the second-level control channel from the first terminal device.

For example, the second terminal device may receive the first-level control channel and the second-level control channel on a sidelink.

S904: The second terminal device parses the first-level control channel to obtain the resource occupied by the second-level control channel.

A resource occupied by the first-level control channel is located in the first resource set, and is usually a resource preconfigured in a network or predefined in a protocol. In other words, the resource occupied by the first-level control channel is known. In addition, the first-level control channel is usually sent in a broadcast manner, and a modulation and coding scheme of the first-level control channel is also known. In other words, the second terminal device may perform demodulation and decoding on the first-level control channel based on the resource occupied by the first-level control channel and the modulation and coding scheme, to obtain content, for example, resource configuration information and a demodulation parameter of the second-level control channel, carried on the first-level control channel.

In a possible design method, the second terminal device may select, from the first resource set or the second resource set, the resource occupied by the second-level control channel, where the first resource set includes the resource occupied by the first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design method, the selecting a resource occupied by a second-level control channel from a first resource set or a second resource set may include: when a difference between a total quantity of resources of the first resource set and a quantity of resources occupied by the first-level control channel is greater than or equal to a quantity of resources occupied by the second-level control channel, selecting the resource occupied by the second-level control channel from the first resource set, to further reduce a decoding delay of the second-level control channel.

Optionally, a time domain start symbol of the resource occupied by the second-level control channel and a time domain start symbol of the resource occupied by the first-level control channel may be a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design method, the selecting a resource occupied by a second-level control channel from a first resource set or a second resource set may include: when a difference between a total quantity of resources of the first resource set and a quantity of resources occupied by the first-level control channel is less than a quantity of resources occupied by the second-level control channel, selecting the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

It should be noted that for specific implementations in which the second terminal device determines the quantity of resources occupied by the second-level control channel, a time domain position of the resource occupied by the second-level control channel, and a frequency domain position of the resource occupied by the second-level control channel, refer to FIG. 10 to FIG. 15 in S901 and related text descriptions. Details are not described herein again.

S905: The second terminal device parses the second-level control channel based on the resource occupied by the second-level control channel, to obtain content carried on the second-level control channel.

The content carried on the second-level control channel may include a resource occupied by the data channel and a demodulation parameter. It should be noted that for specific implementations in which the second terminal device determines a quantity of resources occupied by the data channel, a time domain position of the resource occupied by the data channel, and a frequency domain position of the resource occupied by the data channel, refer to FIG. 10 to FIG. 15 in S901 and related text descriptions. Details are not described herein again.

In a possible design method, after FFT is performed and a CP is removed, the second-level control channel may be parsed by performing a demodulation and decoding (demodulation & decoding) procedure in a reverse order of the modulation and coding procedure shown in FIG. 8, to obtain the content carried on the second-level control channel. A demodulation and decoding procedure for the data channel may sequentially include the following steps: resource demapping, MIMO decoding, layer demapping, descrambling, channel demultiplexing, rate de-matching, and channel decoding.

It should be noted that the first-level control channel and the second-level control channel serve data transmission, and the second-level control channel carries the demodulation parameter and resource configuration information of the data channel. The resource configuration information of the data channel is used to obtain the resource occupied by the data channel. The resource occupied by the data channel may include: a resource that is selected from the first resource set and the second resource set and that is other than the resource occupied by the first-level control channel, the resource occupied by the second-level control channel, and a resource occupied by a demodulation reference signal of the data channel.

S906: The second terminal device parses the data channel based on the resource occupied by the data channel, to obtain data carried on the data channel.

In a possible design method, after the FFT is performed and the CP is removed, the data channel may be parsed by performing the demodulation and decoding (demodulation & decoding) procedure in the reverse order of the modulation and coding procedure shown in FIG. 8, to obtain the data carried on the data channel. The demodulation and decoding procedure for the data channel may sequentially include the following steps: resource demapping, MIMO decoding, layer demapping, descrambling, channel demultiplexing, rate de-matching, and channel decoding.

According to the method for sending two levels of control channels shown in FIG. 9, the first terminal device may select the resource occupied by the second-level control channel from the first resource set or the second resource set. When power enhancement is not performed on the first-level control channel, the resource occupied by the second-level control channel may be selected from the first resource set; or when power enhancement is performed on the first-level control channel, the resource occupied by the second-level control channel may be selected from the second resource set, so that the reliability of the second-level control channel is ensured, and the decoding delay of the second-level control channel can be reduced.

The foregoing describes in detail the method for sending two levels of control channels provided in the embodiments of this application with reference to FIG. 3 to FIG. 15. The following describes in detail the terminal device provided in the embodiments of this application with reference to FIG. 16, and describes in detail a communications apparatus provided in the embodiments of this application with reference to FIG. 17.

Figure 16:
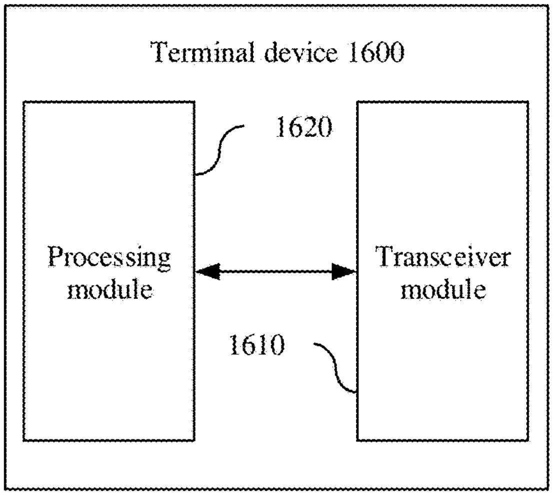
FIG. 16 is a schematic structural diagram of a terminal device according to an embodiment of this application.

For example, FIG. 16 is a schematic structural diagram of a terminal device according to an embodiment of this application. As shown in FIG. 16, the terminal device 1600 includes a transceiver module 1610 and a processing module 1620. The terminal device 1600 may be configured to implement functions of the first terminal device or the second terminal device in the foregoing method embodiments. The terminal device 1600 may be an independent terminal device, for example, a handheld terminal device, a vehicle-mounted terminal device, or vehicle user equipment; or may be a chip included in a terminal device; or the terminal device 1600 is an in-vehicle apparatus, for example, an in-vehicle module or an in-vehicle unit built in a vehicle.

In a possible design, when the terminal device 1600 shown in FIG. 16 is used as the first terminal device to perform the method embodiment shown in FIG. 3, the processing module 1620 is configured to determine, in a second resource set, a resource occupied by a second-level control channel and a resource occupied by a data channel, where the second resource set is located after a first resource set in time domain and is adjacent to the first resource set, and the second-level control channel occupies all symbols in the second resource set in time domain.

The transceiver module 1610 is configured to send the second-level control channel and the data channel, where an average transmit power of the second-level control channel is higher than an average transmit power of the data channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the first resource set includes a resource occupied by a first-level control channel, and the first-level control channel carries an aggregation level of the second-level control channel. Correspondingly, the processing module 1620 is further configured to determine, based on the aggregation level and a minimum resource scheduling granularity of the second-level control channel, a quantity of resources occupied by the second-level control channel, to further determine a quantity of resources occupied by the data channel.

Optionally, the processing module 1620 is further configured to determine a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the processing module 1620 is further configured to determine, based on the quantity of resources occupied by the second-level control channel, a frequency domain position of the resource occupied by the second-level control channel in the second resource set. Specifically, the resource occupied by the second-level control channel may be determined in the second resource set according to a preset rule. For example, the second-level control channel may occupy, by starting from a resource block with a smallest number, one or more resource blocks in the second resource set in ascending order of resource block numbers, to reduce the resource overheads.

In a possible design, multiple-input multiple-output MIMO coding, layer mapping, and resource mapping may be independently performed on each of the first-level control channel, the second-level control channel, and the data channel. That is, after channel coding and rate matching are independently performed on each of the first-level control channel, the second-level control channel, and the data channel, the MIMO coding, the layer mapping, and the resource mapping may be independently performed on the resources respectively occupied by the first-level control channel, the second-level control channel, and the data channel, so that when the plurality of channels are included, a modulation and coding procedure of the first terminal device can be simplified, thereby improving efficiency.

Optionally, the processing module 1620 is further configured to: map, first in frequency domain and then in time domain, the second-level control channel on the resource occupied by the second-level control channel; and map, first in frequency domain and then in time domain, the data channel on the resource occupied by the data channel.

In another possible design, when the terminal device 1600 shown in FIG. 16 is used as the second terminal device to perform the method embodiment shown in FIG. 3, the transceiver module 1610 is configured to receive a second-level control channel and a data channel, where an average transmit power of the second-level control channel is higher than an average transmit power of the data channel; the processing module 1620 is configured to: determine a resource occupied by the second-level control channel in a second resource set, and parse the second-level control channel based on the resource occupied by the second-level control channel, to obtain a resource occupied by the data channel in the second resource set, where the second resource set is located after a first resource set in time domain and is adjacent to the first resource set, and the second-level control channel occupies all symbols in the second resource set in time domain; and the processing module 1620 is further configured to parse the data channel based on the resource occupied by the data channel, to obtain data carried on the data channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the first resource set includes a resource occupied by a first-level control channel, and the first-level control channel carries an aggregation level of the second-level control channel. Correspondingly, the processing module 1620 is further configured to determine, based on the aggregation level and a minimum resource scheduling granularity of the second-level control channel, a quantity of resources occupied by the second-level control channel, to further determine a quantity of resources occupied by the data channel.

Optionally, the processing module 1620 is further configured to determine a product of the aggregation level and the minimum resource scheduling granularity of the second-level control channel as the quantity of resources occupied by the second-level control channel.

The minimum resource scheduling granularity may be N resource blocks RBs in frequency domain, and may be all the symbols in the second resource set in time domain, where N is a positive integer.

Further, the processing module 1620 is further configured to determine, based on the quantity of resources occupied by the second-level control channel, a frequency domain position of the resource occupied by the second-level control channel in the second resource set. Specifically, the resource occupied by the second-level control channel may be determined in the second resource set according to a preset rule. For example, the second-level control channel may occupy, by starting from a resource block with a smallest number, one or more resource blocks in the second resource set in ascending order of resource block numbers. In this way, information indicating the frequency domain position of the resource occupied by the second-level control channel may not be transmitted, to reduce the resource overheads.

In a possible design, after FFT is performed and a CP is removed, each of the second-level control channel and the data channel may be parsed by performing a demodulation and decoding procedure (demodulation & decoding) in a reverse order of a modulation and coding procedure, to obtain content carried on the second-level control channel and content carried on the data channel. The demodulation and decoding procedure for each channel may sequentially include the following steps: resource demapping, MIMO decoding, layer demapping, descrambling, channel demultiplexing, rate de-matching, and channel decoding.

It should be noted that, because the second-level control channel carries a demodulation parameter and wireless resource configuration information of the data channel, the second-level control channel needs to be parsed first, and then the data channel can be parsed.

Optionally, the processing module 1620 is further configured to: demap, first in frequency domain and then in time domain, the second-level control channel on the resource occupied by the second-level control channel; and demap, first in frequency domain and then in time domain, the data channel on the resource occupied by the data channel.

It should be noted that, because resource configuration information (for example, the aggregation level) and a demodulation parameter (for example, an MCS) of the second-level control channel are carried on the first-level control channel, the terminal device 1600 shown in FIG. 16 needs to first parse the first-level control channel, and then can parse the second-level control channel. Therefore, the transceiver module 1610 is further configured to receive the first-level control channel. The processing module 1620 is further configured to parse the first-level control channel. The resource occupied by the first-level control channel is located in the first resource set, and is usually a resource preconfigured in a network or predefined in a protocol.

In still another possible design, when the terminal device 1600 shown in FIG. 16 is used as the first terminal device to perform the method embodiment shown in FIG. 9, the processing module 1620 is configured to select, from a first resource set or a second resource set, a resource occupied by a second-level control channel, where the first resource set includes a resource occupied by a first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain; and the transceiver module 1610 is configured to send the first-level control channel and the second-level control channel.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the processing module 1620 is further configured to: when a difference between a total quantity of resources of the first resource set and a quantity of resources occupied by the first-level control channel is greater than or equal to a quantity of resources occupied by the second-level control channel, select the resource occupied by the second-level control channel from the first resource set, to further reduce a decoding delay of the second-level control channel.

Optionally, a time domain start symbol of the resource occupied by the second-level control channel and a time domain start symbol of the resource occupied by the first-level control channel are a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design, the processing module 1620 is further configured to: when a difference between a total quantity of resources of the first resource set and a quantity of resources occupied by the first-level control channel is less than a quantity of resources occupied by the second-level control channel, select the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

In a possible design, multiple-input multiple-output MIMO coding, layer mapping, and resource mapping may be independently performed on each of the first-level control channel, the second-level control channel, and a data channel. That is, after channel coding and rate matching are independently performed on each of the first-level control channel, the second-level control channel, and the data channel, the MIMO coding, the layer mapping, and the resource mapping may be independently performed on resources respectively occupied by the first-level control channel, the second-level control channel, and the data channel, so that when the plurality of channels are included, a modulation and coding procedure of the first terminal device can be simplified, thereby improving efficiency.

Optionally, the processing module 1620 is further configured to: map, first in frequency domain and then in time domain, the second-level control channel on the resource occupied by the second-level control channel; and map, first in frequency domain and then in time domain, the data channel on the resource occupied by the data channel.

In yet another possible design, when the terminal device 1600 shown in FIG. 16 is used as the first terminal device to perform the method embodiment shown in FIG. 9, the transceiver module 1610 is configured to receive a first-level control channel and a second-level control channel; and the processing module 1620 is configured to parse the first-level control channel to obtain a resource occupied by the second-level control channel, where specifically, the processing module 1620 is configured to select the resource occupied by the second-level control channel from a first resource set or a second resource set, where the first resource set includes a resource occupied by the first-level control channel, and the second resource set is located after the first resource set in time domain and is adjacent to the first resource set; and when the resource occupied by the second-level control channel is selected from the first resource set, the resource occupied by the second-level control channel is adjacent to the resource occupied by the first-level control channel in frequency domain; or when the resource occupied by the second-level control channel is selected from the second resource set, the resource occupied by the second-level control channel is adjacent to the resource occupied by the first-level control channel in time domain; and the processing module 1620 is further configured to parse, based on the resource occupied by the second-level control channel, content carried on the second-level control channel. The resource occupied by the first-level control channel is located in the first resource set, and is usually a resource preconfigured in a network or predefined in a protocol.

For example, the first resource set may occupy an $n^{th}$ symbol to an $(n+k)^{th}$ symbol in a time unit, and a time domain start symbol of the second resource set is an $(n+k+1)^{th}$ symbol in the time unit, where n is 0 or 1, and k is a positive integer. In this way, information indicating a time domain start position of the second resource set can be saved, so that resource overheads are reduced.

In a possible design, the processing module 1620 is further configured to: when a difference between a total quantity of resources of the first resource set and a quantity of resources occupied by the first-level control channel is greater than or equal to a quantity of resources occupied by the second-level control channel, select the resource occupied by the second-level control channel from the first resource set, to further reduce a decoding delay of the second-level control channel.

Optionally, a time domain start symbol of the resource occupied by the second-level control channel and a time domain start symbol of the resource occupied by the first-level control channel may be a same time domain symbol, that is, the resource occupied by the second-level control channel and the resource occupied by the first-level control channel may be aligned in time domain. In this way, indication information indicating the time domain start symbol of the resource occupied by the second-level control channel can be saved, so that the resource overheads are reduced.

In another possible design, the processing module 1620 is further configured to: when a difference between a total quantity of resources of the first resource set and a quantity of resources occupied by the first-level control channel is less than a quantity of resources occupied by the second-level control channel, select the resource occupied by the second-level control channel from the second resource set. That is, when the first resource set is insufficient to carry both the first-level control channel and the second-level control channel, the resource occupied by the second-level control channel may be selected from the second resource set. When power enhancement is performed on the first-level control channel, a time domain symbol occupied by the first-level control channel can be avoided, so that reliability of the second-level control channel is ensured.

Further, that the resource occupied by the second-level control channel is adjacent to the resource occupied by the first-level control channel in time domain may include: the time domain start symbol of the resource occupied by the second-level control channel is a next time domain symbol of a time domain end symbol of the resource occupied by the first-level control channel, that is, the second-level control channel is mapped by starting from a next symbol of the time domain symbol occupied by the first-level control channel, so that the second-level control channel is sent as early as possible, thereby reducing the decoding delay of the second-level control channel.

Still further, a frequency domain start position of the resource occupied by the second-level control channel may be the same as a frequency domain start position of the resource occupied by the first-level control channel, that is, the resource occupied by the second-level control channel and the resource occupied by the first-level control channel may be aligned in frequency domain. In this way, indication information indicating the frequency domain start position of the resource occupied by the second-level control channel can be saved, so that the resource overheads are reduced.

Similarly, the frequency domain start position of the resource occupied by the second-level control channel may alternatively be the same as a frequency domain start position of the second resource set, that is, the resource occupied by the second-level control channel and the second resource set may be aligned in frequency domain. In this way, indication information indicating the frequency domain start position of the resource occupied by the second-level control channel can be saved, so that the resource overheads are reduced.

It should be noted that the first-level control channel and the second-level control channel serve data transmission, and the second-level control channel carries a demodulation parameter and resource configuration information of a data channel. Therefore, in a possible design, the processing module 1620 is further configured to: obtain, based on the resource occupied by the second-level control channel, a resource occupied by the data channel and the demodulation parameter; and parse the data channel based on the resource occupied by the data channel and the demodulation parameter, to obtain data carried on the data channel, where the resource occupied by the data channel may include: a resource that is selected from the first resource set and the second resource set and that is other than the resource occupied by the first-level control channel, the resource occupied by the second-level control channel, and a resource occupied by a demodulation reference signal of the data channel.

In a possible design, after FFT is performed and a CP is removed, each of the second-level control channel and the data channel may be parsed based on a demodulation and decoding (demodulation & decoding) procedure in a reverse order of the modulation and coding procedure provided in the third aspect, to obtain the content carried on the second-level control channel and the data carried on the data channel. The demodulation and decoding procedure for each channel may sequentially include the following steps: resource demapping, MIMO decoding, layer demapping, descrambling, channel demultiplexing, rate de-matching, and channel decoding.

It should be noted that, because the first-level control channel carries a demodulation parameter and resource configuration information of the second-level control channel, the first-level control channel needs to be parsed first, and then the second-level control channel can be parsed. Similarly, because the second-level control channel carries the demodulation parameter and the resource configuration information of the data channel, the second-level control channel needs to be parsed first, and then the data channel can be parsed.

Optionally, the processing module 1620 is further configured to: demap, first in frequency domain and then in time domain, the second-level control channel on the resource occupied by the second-level control channel; and demap, first in frequency domain and then in time domain, the data channel on the resource occupied by the data channel.

For technical effects of the terminal device 1600 shown in FIG. 16, refer to the technical effects of the method provided in the third aspect. Details are not described herein again.

Optionally, the terminal device 1600 shown in FIG. 16 may further include a storage module (not shown in FIG. 16), and the storage module stores a program or an instruction. When the processing module 1620 executes the program or the instruction, the terminal device 1600 shown in FIG. 16 may perform the method for sending two levels of control channels shown in FIG. 3 or FIG. 9.

It should be noted that the terminal device 1600 shown in FIG. 16 may be an independent terminal device, or may be a chip or a chip system disposed in the terminal device. This is not limited in this application.

For technical effects of the terminal device 1600 shown in FIG. 16, refer to the technical effects of the method for sending two levels of control channels shown in FIG. 3 or FIG. 9. Details are not described herein again.

The terminal device 1600 shown in FIG. 16 may also be referred to as a communications apparatus. The processing module 1620 in the communications apparatus may be implemented by a processor or a processor-related circuit component, and may be a processor or a processing unit. The transceiver module 1610 may be implemented by a transceiver or a transceiver-related circuit component, and may be a transceiver or a transceiver unit. An operation and/or a function of each module in the communications apparatus is used to implement a corresponding procedure of the method shown in FIG. 3 or FIG. 9. For brevity, details are not described herein again.

Figure 17:
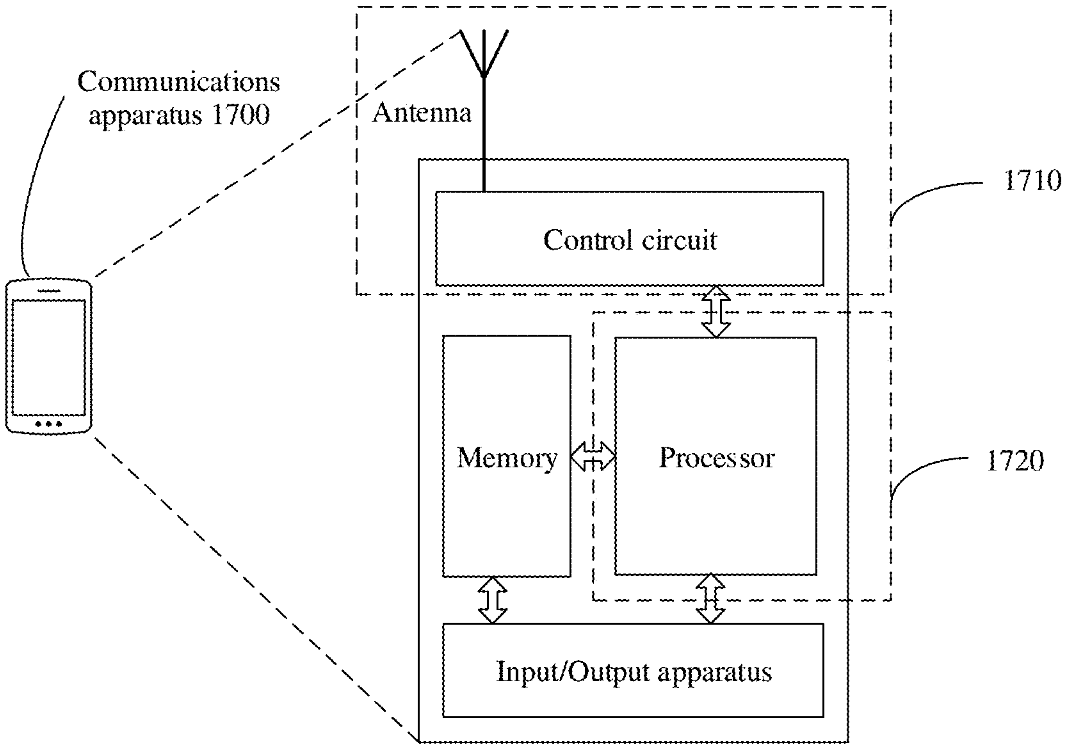
FIG. 17 is a schematic structural diagram of a communications apparatus according to an embodiment of this application.

FIG. 17 is a schematic structural diagram of a communications apparatus according to an embodiment of this application. As shown in FIG. 17, the communications apparatus may be specifically a terminal device, for example, the terminal device shown in FIG. 16. For ease of understanding and illustration, a mobile phone is used as an example of the communications apparatus in FIG. 17. As shown in FIG. 17, the communications apparatus 1700 includes a processor, and may further include a memory. Certainly, the communications apparatus 1700 may further include a radio frequency circuit, an antenna, an input/output apparatus, and the like. The processor is mainly configured to: process a communications protocol and communication data, control the communications apparatus 1700, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to: receive data entered by a user and output data to the user. It should be noted that some types of communications apparatuses 1700 may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to outside in a form of an electromagnetic wave through the antenna. When data is sent to the communications apparatus 1700, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual communications apparatus 1700, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have transmission and reception functions may be considered as a transceiver unit of the communications apparatus 1700, and the processor that has a processing function may be considered as a processing unit of the communications apparatus 1700. As shown in FIG. 17, the communications device 1700 includes a transceiver unit 1710 and a processing unit 1720. The transceiver unit 1710 may also be referred to as a transceiver, a transceiver machine, a transceiver apparatus, a transceiver circuit, or the like. The processing unit 1720 may also be referred to as a processor, a processing board, a processing module, a processing apparatus, or the like. Optionally, a component that is in the transceiver unit 1710 and that is configured to implement a receiving function may be considered as a receiving unit, and a component that is in the transceiver unit 1710 and that is configured to implement a sending function may be considered as a sending unit. In other words, the transceiver unit 1710 includes the receiving unit and the sending unit. The receiving unit may also be sometimes referred to as a receiver machine, a receiver, a receiver apparatus, a receiver circuit, or the like. The sending unit may also be sometimes referred to as a transmitter machine, a transmitter, a transmitter apparatus, a transmitter circuit, or the like. It should be understood that the transceiver unit 1710 is configured to perform a sending operation and a receiving operation on a terminal device side in the foregoing method embodiment, and the processing unit 1720 is configured to perform an operation other than the sending operation and the receiving operation on the terminal device side in the foregoing method embodiment.

An embodiment of this application further provides a chip system, including a processor. The processor is coupled to a memory, the memory is configured to store a program or an instruction, and when the program or the instruction is executed by the processor, the chip system is enabled to implement the method in any one of the foregoing method embodiments.

Optionally, there may be one or more processors in the chip system. The processor may be implemented by using hardware, or may be implemented by using hardware. When the processor is implemented by using hardware, the processor may be a logic circuit, an integrated circuit, or the like. When the processor is implemented by using software, the processor may be a general purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated chip (ASIC), a system on chip (SoC), a central processing unit (CPU), a network processor (NP), a digital signal processor (DSP), a micro controller (MCU), a programmable logic device (PLD), or another integrated chip.

It should be understood that the steps in the foregoing method embodiments may be implemented by using a hardware integrated logic circuit in the processor or an instruction in a form of software. The steps of the method disclosed with reference to the embodiments of this application may be directly performed by a hardware processor, or may be performed by using a combination of hardware in the processor and a software module.

An embodiment of this application further provides a computer-readable storage medium. The computer-readable storage medium stores a computer-readable instruction. When a computer reads and executes the computer-readable instruction, the computer is enabled to perform the method in any one of the foregoing method embodiments.

An embodiment of this application further provides a computer program product. When a computer reads and executes the computer program product, the computer is enabled to perform the method in any one of the foregoing method embodiments.

An embodiment of this application further provides a communications system. The communications system includes a sending terminal such as the foregoing first terminal device, and one or more receiving terminals such as the foregoing second terminal device. The sending terminal is configured to perform a function of the first terminal device in the foregoing method embodiment, and the receiving terminal is configured to perform a function of the second terminal device in the foregoing method embodiment. Any one of the at least two terminal devices may be an independent terminal device, for example, a mobile phone; or may be an apparatus, a module, or another component disposed inside the terminal device, for example, a chip, a chip system, or an in-vehicle module.

Optionally, the communications system may further include a network device, such as a base station or a road side unit (RSU).

It should be understood that, the processor mentioned in the embodiments of this application may be a central processing unit (CPU), and may alternatively be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example descriptions rather than limitative descriptions, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification is intended to include but is not limited to these memories and any memory of another proper type.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

selecting, from a second resource set, a resource to be occupied by second-level control information, wherein a time domain start symbol of the second resource set is an $(n+k+1)^{th}$ symbol in a time unit, n is 1, k is a positive integer, a first resource set comprises a resource to be occupied by first-level control information, and first-level control information occupies all symbols of the first resource set, and the first resource set occupies an $n^{th}$ symbol to an $(n+k)^{th}$ symbol in the time unit; and sending, from a first terminal device to a second terminal device, the first-level control information and the second-level control information, wherein the resource occupied by the second-level control information is adjacent, in time domain, to the resource occupied by the first-level control information, and a frequency domain start position of the resource occupied by the second-level control information is the same as a frequency domain start position of the resource occupied by the first-level control information; and wherein the second-level control information is mapped first in frequency domain and then in time domain to the resource to be occupied by the second-level control information, comprising mapping the second-level control information to a first symbol of the second resource set in a resource block that is the frequency domain start position of the resource occupied by the second-level control information, then mapping the second-level control information to one or more remaining resource blocks of the second resource set in the first symbol in ascending order, and then mapping the second-level control information to resource blocks of the second resource set of a next symbol of the second resource set in ascending order.

2. The method according to claim 1, wherein:

the first-level control information comprises basic control information comprising a destination user ID, a data channel frequency domain bandwidth, resource reservation information, an initial transmission time interval, or a retransmission time interval at an L1 layer, and the second-level control information comprises link maintenance information comprising a modulation and coding scheme of a data channel, a hybrid automatic repeat request version number of the data channel, or a new transmission or retransmission indication of the data channel.

3. The method according to claim 1, wherein the first-level control information comprises an aggregation level of the second-level control information, and wherein the method further comprises:

determining, based on the aggregation level and a minimum resource scheduling granularity of the second-level control information, a quantity of resources occupied by the second-level control information.

4. The method according to claim 1, wherein the time unit is a slot.

5. The method according to claim 4, wherein a symbol o in the slot is for automatic gain control (AGC).

6. The method according to claim 1, wherein the first-level control information occupies more frequency subcarriers than the second-level control information.

7. The method according to claim 1, wherein a frequency domain end position of the resource occupied by the second-level control information is different than a frequency domain end position of the resource occupied by the first-level control information.

8. A method, comprising:

selecting, from a second resource set, a resource to be occupied by second-level control information, wherein a time domain start symbol of the second resource set is an $(n+k+1)^{th}$ symbol in a time unit, n is 1, k is a positive integer, a first resource set comprises a resource to be occupied by first-level control information, the first-level control information occupies all symbols of the first resource set, and the first resource set occupies an $n^{th}$ symbol to an $(n+k)^{th}$ symbol in the time unit; and receiving, by a second terminal device from a first terminal device, the first-level control information and the second-level control information, wherein the resource occupied by the second-level control information is adjacent, in time domain, to the resource occupied by the first-level control information, a frequency domain start position of the resource occupied by the second-level control information is the same as a frequency domain start position of the resource occupied by the first-level control information; and wherein the second-level control information is mapped first in frequency domain and then in time domain to the resource to be occupied by the second-level control information, comprising the second-level control information being mapped to a first symbol of the second resource set in a resource block that is the frequency domain start position of the resource occupied by the second-level control information, then the second-level control information being mapped to one or more remaining resource blocks of the second resource set in the first symbol in ascending order, and then the second-level control information being mapped to resource blocks of the second resource set of a next symbol of the second resource set in ascending order.

9. The method according to claim 8, wherein:

the first-level control information comprises basic control information comprising a destination user ID, a data channel frequency domain bandwidth, resource reservation information, an initial transmission time interval, or a retransmission time interval at an L1 layer, and the second-level control information comprises link maintenance information comprising a modulation and coding scheme of a data channel, a hybrid automatic repeat request version number of the data channel, or a new transmission or retransmission indication of the data channel.

10. The method according to claim 8, wherein the first-level control information comprises an aggregation level of the second-level control information, and wherein the method further comprises:

determining, based on the aggregation level and a minimum resource scheduling granularity of the second-level control information, a quantity of resources occupied by the second-level control information.

11. The method of claim 8, wherein the time unit is a slot.

12. The method of claim 11, wherein a symbol o in the slot is for automatic gain control (AGC).

13. An apparatus, comprising:

at least one processor; and one or more non-transitory memories coupled to the at least one processor and storing programming instructions that are executable by the at least one processor, wherein execution of the programming instructions causes the apparatus to:

select, from a second resource set, a resource to be occupied by second-level control information, wherein a time domain start symbol of the second resource set is an $(n+k+1)^{th}$ symbol in a time unit, n is 1, k is a positive integer, a first resource set comprises a resource to be occupied by first-level control information, the first-level control information occupies all symbols of the first resource set, and the first resource set occupies an $n^{th}$ symbol to an $(n+k)^{th}$ symbol in the time unit; and send, from a first terminal device to a second terminal device, the first-level control information and the second-level control information, wherein the resource occupied by the second-level control information is adjacent, in time domain, to the resource occupied by the first-level control information, a frequency domain start position of the resource occupied by the second-level control information is the same as a frequency domain start position of the resource occupied by the first-level control information; and wherein the second-level control information is mapped first in frequency domain and then in time domain to the resource to be occupied by the second-level control information, comprising the second-level control information being mapped to a first symbol of the second resource set in a resource block that is the frequency domain start position of the resource occupied by the second-level control information, then the second-level control information being mapped to one or more remaining resource blocks of the second resource set in the first symbol in ascending order, and then the second-level control information being mapped to resource blocks of the second resource set of a next symbol of the second resource set in ascending order.

14. The apparatus according to claim 13, wherein the resource to be occupied by the second-level control information is selected from the first resource set, and the resource to be occupied by the second-level control information is adjacent, in frequency domain, to the resource used to carry the first-level control information.

15. The apparatus according to claim 13, wherein:

the first-level control information comprises basic control information comprising a destination user ID, a data channel frequency domain bandwidth, resource reservation information, an initial transmission time interval, or a retransmission time interval at an L1 layer, and the second-level control information comprises link maintenance information comprising a modulation and coding scheme of a data channel, a hybrid automatic repeat request version number of the data channel, or a new transmission or retransmission indication of the data channel.

16. The apparatus according to claim 13, wherein the first-level control information comprises an aggregation level of the second-level control information, and wherein execution of the programming instructions further causes the apparatus to:

determining, based on the aggregation level and a minimum resource scheduling granularity of the second-level control information, a quantity of resources occupied by the second-level control information.

17. The apparatus of claim 13, wherein the time unit is a slot.

18. The apparatus according to claim 13, wherein a frequency domain end position of the resource occupied by the second-level control information is different than a frequency domain end position of the resource occupied by the first-level control information.

* * * * *